(12) United States Patent
Takeda et al.

(10) Patent No.: US 11,978,182 B2
(45) Date of Patent: May 7, 2024

(54) IMAGE PROCESSING APPARATUS, IMAGE PROCESSING METHOD, AND PROGRAM

(71) Applicant: NIPPON TELEGRAPH AND TELEPHONE CORPORATION, Tokyo (JP)

(72) Inventors: Shoichiro Takeda, Musashino (JP); Kazuki Okami, Musashino (JP); Megumi Isogai, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 354 days.

(21) Appl. No.: 17/605,154

(22) PCT Filed: May 31, 2019

(86) PCT No.: PCT/JP2019/021820
§ 371 (c)(1),
(2) Date: Oct. 20, 2021

(87) PCT Pub. No.: WO2020/240853
PCT Pub. Date: Dec. 3, 2020

(65) Prior Publication Data
US 2022/0198615 A1 Jun. 23, 2022

(51) Int. Cl.
*G06T 5/70* (2024.01)
*G06T 5/20* (2006.01)
*G06T 7/246* (2017.01)

(52) U.S. Cl.
CPC ............. *G06T 5/70* (2024.01); *G06T 5/20* (2013.01); *G06T 7/246* (2017.01); *G06T 2207/20182* (2013.01)

(58) Field of Classification Search
CPC .. G06T 5/70; G06T 5/20; G06T 7/246; G06T 2207/20182; G06T 2207/10016;
(Continued)

(56) References Cited

U.S. PATENT DOCUMENTS

| 4,469,601 A | * | 9/1984 | Beaver | ............ G01N 30/90 210/198.3 |
| 6,329,139 B1 | * | 12/2001 | Nova | ............ B82Y 10/00 506/40 |

(Continued)

FOREIGN PATENT DOCUMENTS

| JP | 4617883 B2 | * | 1/2011 | ............ G06K 9/32 |
| JP | 2011086265 A | * | 4/2011 | ......... G06K 9/00248 |

(Continued)

OTHER PUBLICATIONS

Neal Wadhwa et al., Riesz Pyramids for Fast Phase-Based Video Magnification, IEEE International Conference on Computational Photography, 2014.
(Continued)

*Primary Examiner* — Mahendra R Patel
(74) *Attorney, Agent, or Firm* — Harness, Dickey & Pierce, P.L.C.

(57) ABSTRACT

An image processing apparatus includes a change detection unit configured to detect a direction change, which is a temporal fluctuation in a plausible direction orthogonal to an edge determined for each pixel in an edge image indicating a high frequency component in an image that is an image processing target, and a phase change, which is a temporal fluctuation of a phase of the high frequency component according to the direction change, and a reliability estimation unit configured to estimate reliability indicating that the detected phase change is not a change caused by noise based on a variance value of the direction change per unit time.

7 Claims, 17 Drawing Sheets

(58) Field of Classification Search
CPC . G06T 2207/10024; G06T 2207/20016; G06T 2207/20056; G06T 7/254; G06T 7/207
USPC ........................................................ 382/107
See application file for complete search history.

(56) References Cited

U.S. PATENT DOCUMENTS

| | | | |
|---|---|---|---|
| 10,368,017 B2* | 7/2019 | Maruyama | H04N 23/843 |
| 2003/0216899 A1* | 11/2003 | Ascenzi | G09B 23/30 |
| | | | 703/11 |
| 2012/0250993 A1* | 10/2012 | Iso | G06T 5/00 |
| | | | 382/167 |
| 2013/0077862 A1* | 3/2013 | Nomura | G06T 5/70 |
| | | | 382/167 |

FOREIGN PATENT DOCUMENTS

| | | | | |
|---|---|---|---|---|
| JP | 2011205209 A | * | 10/2011 | |
| JP | 2012256202 A | * | 12/2012 | ............. G06T 5/002 |
| JP | 5772817 B2 | * | 9/2015 | ............ G06K 9/4642 |
| WO | WO-2004077351 A1 | * | 9/2004 | ............ G06K 9/4609 |
| WO | WO-2011158572 A1 | * | 12/2011 | ................ G06K 9/32 |

OTHER PUBLICATIONS

Shoichiro Takeda et al., Jerk-Aware Video Acceleration Magnification, IEEE International Conference on Computer Vision and Pattern Recognition, 2018.

\* cited by examiner

IMAGE PROCESSING APPARATUS, IMAGE PROCESSING METHOD, AND PROGRAM

CROSS-REFERENCE TO RELATED APPLICATIONS

This application is a 371 U.S. National Phase of International Application No. PCT/JP2019/021820 filed on May 31, 2019. The entire disclosure of the above application is incorporated herein by reference.

TECHNICAL FIELD

The present disclosure relates to an image processing apparatus, an image processing method, and a program.

BACKGROUND ART

The amount of change in a subtle motion change of an image in frames of a moving image may be emphasized or attenuated by an image processing apparatus. A technique for adjusting the amount of change in the subtle motion change of the image by the emphasis or attenuation is referred to as "video magnification". The image processing apparatus can visualize a physical phenomenon that is not captured by human vision in the frames of the moving image by the emphasis in the video magnification. The image processing apparatus can also remove unnecessary image fluctuations (for example, shakes, ground vibrations, and the like) mixed in the frames of the moving image from the frames by the attenuation in the video magnification.

When the subtle motion change of the image is detected based on a phase change of a local image in the frame of the moving image, the image processing apparatus applies a temporal filter to the frames. Accordingly, the image processing apparatus can detect a subtle motion change of an image of a subject (see Non Patent Documents 1 and 2).

CITATION LIST

Non Patent Document

Non Patent Document 1: Neal Wadhwa, Michael Rubinstein, Fredo Durand, William T. Freeman. "Riesz Pyramids for Fast Phase-Based Video Magnification". IEEE International Conference on Computational Photography (2014).

Non Patent Document 2: Shoichiro Takeda, Kazuki Okami, Dan Mikami, Megumi Isogai, Hideaki Kimata. "Jerk-Aware Video Acceleration Magnification". IEEE International Conference on Computer Vision and Pattern Recognition (2018).

SUMMARY OF THE INVENTION

Technical Problem

However, there is a problem in that not only an amount of change in meaningful subtle motion change, but also an amount of change in random noise (meaningless subtle motion change) mixed in an image due to, for example, thermal noise of an image sensor is adjusted by an image processing apparatus. When an amount of change in random noise has been adjusted, quality of the image deteriorates and thus, it is necessary to reduce the adjustment of the random noise mixed in the moving image by the image processing apparatus.

In view of the above circumstances, an object of the present disclosure is to provide an image processing apparatus, an image processing method, and a program capable of reducing adjustment of random noise mixed in a moving image when an amount of change in subtle motion change of the moving image is adjusted.

Means for Solving the Problem

An aspect of the present disclosure is an image processing apparatus including a change detection unit configured to detect a direction change, the direction change being a temporal fluctuation in a plausible direction orthogonal to an edge determined in unit of pixels in an edge image indicating a high frequency component in an image that is an image processing target, and a phase change, the phase change being a temporal fluctuation of a phase of the high frequency component according to the direction change, and a reliability estimation unit configured to estimate reliability indicating that the phase change that is detected is not a change caused by noise based on a variance value of the direction change per unit time.

In the image processing apparatus according to the aspect of the present disclosure, the reliability estimation unit estimates the reliability based on the variance value of the direction change in a pixel of the pixels indicating the phase change that is detected.

In the image processing apparatus according to the aspect of the present disclosure, the reliability becomes higher as the variance value becomes smaller.

In the image processing apparatus according to the aspect of the present disclosure, the reliability estimation unit estimates the reliability based on the phase change in a region including the pixels in the edge image in time-series.

The image processing apparatus according to the aspect of the present disclosure further includes a multiplication unit configured to multiply the phase change that is detected by the reliability for each of the pixels in the edge image in time-series, and a change amount adjustment unit configured to adjust an amount of change in the phase change multiplied by the reliability.

An aspect of the present disclosure is an image processing method executed by an image processing apparatus, the image processing method including detecting a direction change, the direction change being a temporal fluctuation in a plausible direction orthogonal to an edge determined in unit of pixels in an edge image indicating a high frequency component in an image that is an image processing target, and a phase change, the phase change being a time-series change of a phase of the high frequency component according to the direction change, and estimating reliability indicating that the phase change that is detected is not a change caused by noise based on a variance value of the direction change per unit time.

An aspect of the present disclosure is a program for causing a computer to operate as the image processing apparatus.

Effects of the Invention

According to the present disclosure, it is possible to reduce adjustment of random noise mixed in a moving image when an amount of change in subtle motion change of the moving image is adjusted.

DESCRIPTION OF EMBODIMENTS

Embodiments of the present disclosure will be described in detail with reference to the drawings.

First Embodiment

Figure 1:
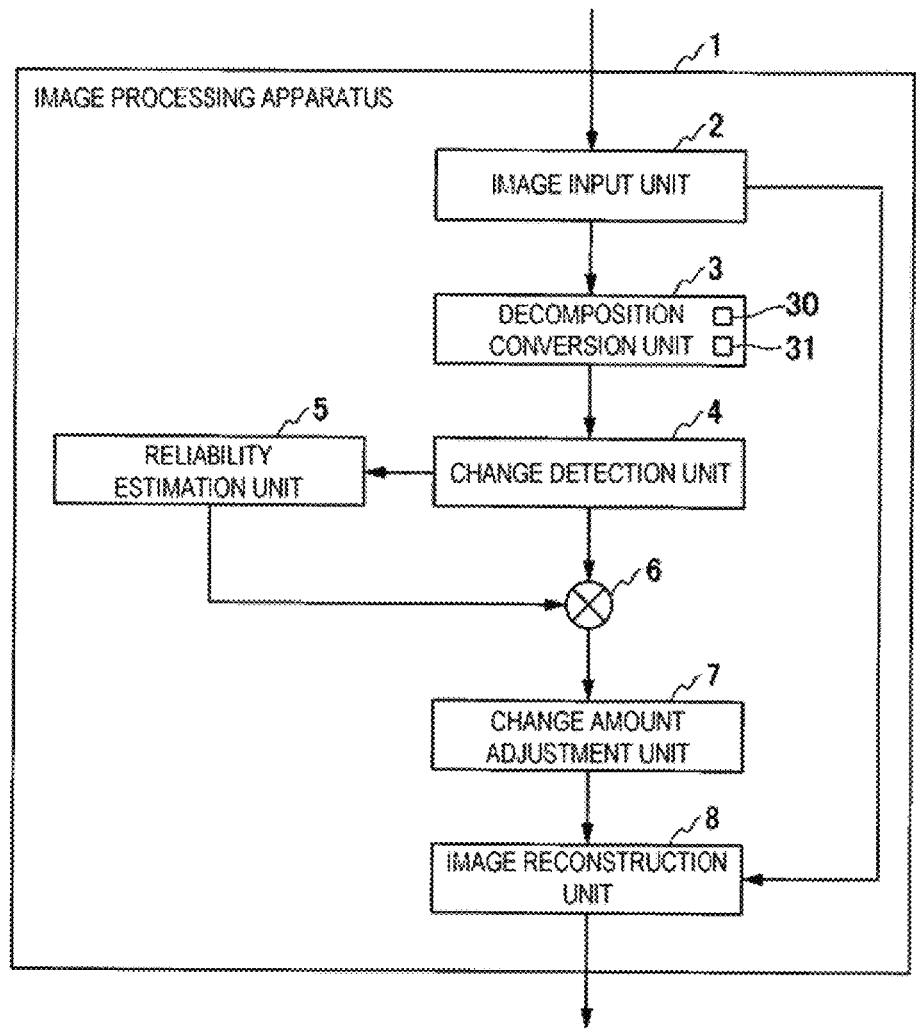
FIG. 1 is a diagram illustrating a configuration example of an image processing apparatus according to a first embodiment.

FIG. 1 is a diagram illustrating a configuration example of an image processing apparatus 1. The image processing apparatus 1 is an apparatus that executes a predetermined image processing on a moving image. The predetermined image processing is, for example, image processing of video magnification. The image processing apparatus 1 performs image processing of video magnification on the moving image to emphasize or attenuate subtle motion change of a subject.

The image processing apparatus 1 includes an image input unit 2, a decomposition conversion unit 3, a change detection unit (change detector) 4, a reliability estimation unit (reliability estimator) 5, a multiplication unit (multiplicator) 6, a change amount adjustment unit (change amount adjuster) 7, and an image reconstruction unit 8. Each functional unit may be provided as a single functional unit in combination, or may be divided and provided as a multiple functional units.

A processor such as a central processing unit (CPU) executes a program stored in a memory which is a nonvolatile recording medium (non-transitory recording medium), and thus, a part or all of functional units of the image processing apparatus 1 is implemented as software. The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory storage medium such as a storage device such as a hard disk drive built into a computer system. The program may be transmitted via an electrical communication line. A part or all of the functional units of the image processing apparatus 1 may be implemented by using hardware including an electronic circuit (or circuitry) using a large scale integration circuit (LSI), an application specific integrated circuit (ASIC), a programmable logic device (PLD), or a field programmable gate array (FPGA).

Hereinafter, an image representing luminance information of a frame of the moving image is referred to as a "luminance image". Hereinafter, an image representing color information of the frame of the moving image is referred to as a "color image". Hereinafter, an x-coordinate in a horizontal direction and a y-coordinate in a vertical direction are determined in the frame of the moving image.

The image input unit 2 receives multiple frames of the moving image as the image processing target. The image input unit 2 generates the luminance images and the color images from the multiple frames of the moving image. The image input unit 2 outputs an original resolution luminance image that is an image processing target to the decomposition conversion unit 3. The image input unit 2 outputs an original resolution color image that is an image processing target to the image reconstruction unit 8.

The decomposition conversion unit 3 (edge image generation unit) receives the original resolution luminance image. The decomposition conversion unit 3 generates, from the original resolution luminance image, edge images having mutually different resolutions. The edge image is an image indicating a spatial frequency component (high frequency component) having a certain frequency or higher in the image that is an image processing target. For example, in the edge image, an outline (edge) of a subject image is extracted. The decomposition conversion unit 3 includes an image decomposition unit 30 and an image conversion unit 31.

The image decomposition unit 30 receives the original resolution luminance image. The image decomposition unit 30 generates, from the received original resolution luminance image, luminance images having mutually different resolutions (hereinafter referred to as "a multi-resolution luminance image"). The image decomposition unit 30 generates, from the multi-resolution luminance image, edge images having mutually different resolutions" (hereinafter referred to as a multi-resolution edge image"). For example, the image decomposition unit 30 generates a difference image between luminance images having a predetermined resolution among luminance images having mutually different resolutions as the multi-resolution edge image. The image decomposition unit 30 outputs the multi-resolution edge images (edge image in a resolution direction) to the image conversion unit 31 for each resolution.

Hereinafter, a symbol given on a character in the equation is written immediately before the character. For example, the symbol "^" above the letter "C" in an equation is written immediately before the letter "C" as in "^C". For example, the symbol "–" above the letter "t" in an equation is written immediately before the letter "t" as in "(–)t". For example, the symbol "~" above the letter "C" in an equation is written immediately before the letter "C" as in "~C".

Hereinafter, a temporal fluctuation in a plausible direction orthogonal to an edge in the pixel is referred to as "direction change". A direction change "$\theta(x, y, t)$" is determined for each pixel at a coordinates (x, y) in the edge image at time "t". The plausible direction orthogonal to the edge is derived as an output of a Riesz transform or the like for an edge image in which an edge represented by a certain amount or more of a luminance component is present. Thus, the direction change "$\theta(x, y, t)$" is time-series data in which a plausible direction $\theta(x, y)$, which is the output of the Riesz transform, is held for the frame of the moving image at time "t". Even when the edge is not present in the pixel, the plausible direction is derived as the output of the Riesz transform or the like. Hereinafter, a time-series change in a phase of the high frequency component according to the direction change is referred to as a "phase change".

The image conversion unit 31 receives the multi-resolution edge image (edge image in the resolution direction). The image conversion unit 31 converts luminance change occurring according to the direction change "$\theta(x, y, t)$" for each edge image and for each pixel at the coordinates (x, y) in the edge image at time "t" to a phase change" $\Phi(x, y, t)$" and an amplitude change "$A(x, y, t)$" of the luminance information according to the same direction change "$\theta(x, y, t)$". That is, in the moving image, the direction change "$\theta(x, y, t)$", the time-series change in phase "$\varphi(x, y, t)$", and the amplitude change "$A(x, y, t)$" are derived.

For example, the image conversion unit 31 converts the luminance change occurring according to the direction change "$\theta(10, 20, 15)=18.3°$" in the pixel at a coordinates (10, 20) in the edge image to a phase change "$\Phi(10, 20, 15)=0.4$" of the luminance information according to the same direction change "$\theta(10,20,15)=18.3°$" with respect to time t (=15) in a time width "(–)t" of 30 edge images.

A phase change of luminance information in a time-series edge image indicates motion change of the image in the time-series edge image.

The image conversion unit 31 outputs information indicating a phase change according to the direction change (hereinafter referred to as "phase change information") and information indicating a direction change (hereinafter referred to as "direction change information") in the multi-resolution edge image to the change detection unit 4 for each pixel in the edge image at time "t" of the moving image.

The change detection unit 4 receives the phase change information and the direction change information of the multi-resolution edge image. For each edge image having the time width "(–)t" (for example, per unit time) around time "t", the change detection unit 4 outputs the direction change information "$\theta''(x, y, t)$" to the reliability estimation unit 5.

For each edge image having the time width "(–)t" around time "t", the change detection unit 4 detects a subtle phase change according to the direction change in the pixels in the multi-resolution edge image. The change detection unit 4 outputs information indicating a subtle phase change according to the direction change (hereinafter referred to as "subtle phase change information") in the pixel in the multi-resolution edge image to the multiplication unit 6.

The reliability estimation unit 5 receives the direction change information with the time width "(–)t". The reliability estimation unit 5 estimates reliability "maskS''''" of the subtle phase change "$C''(x, y, t)$" based on the direction change information. Here, "n" indicates n-th resolution. "n=0"-th resolution indicates the highest resolution. The reliability of the subtle phase change is the reliability of the subtle phase change that occurs in the pixel value of the image due to a physical phenomenon other than random noise. The reliability estimation unit 5 estimates the reliability so that the reliability of the subtle phase change occurring in the pixel value of the image due to random noise mixed in the image due to, for example, thermal noise of the image sensor is lower than the reliability of the subtle phase change occurring in the pixel value of the image due to the physical phenomenon other than the random noise. The reliability estimation unit 5 outputs the estimated reliability "maskS''''" to the multiplication unit 6.

The multiplication unit 6 receives the subtle phase change information and the reliability. The multiplication unit 6 multiplies the subtle phase change information (a value indicating the subtle phase change) by the reliability estimated by the reliability estimation unit 5 for each pixel in the edge image, and outputs a result of the multiplication to the change amount adjustment unit 7. The subtle phase change information is multiplied by the reliability so that the subtle phase change information is associated with the reliability, and thus the subtle phase change "^C''(x, y, t)" occurring in the pixel value of the image due to the physical phenomenon other than random noise is detected with high accuracy.

The change amount adjustment unit 7 receives the multiplication result (the phase change multiplied by the reliability) output by the multiplication unit 6 and executes video magnification on a multiplication result. That is, the change amount adjustment unit 7 adjusts the amount of change in the subtle phase change (motion change) multiplied by the reliability through emphasis or attenuation. Through the adjustment, the change amount adjustment unit 7 generates an edge image of the luminance image in which the amount of change in subtle motion change has been adjusted (hereinafter referred to as an "adjusted edge image"). The change amount adjustment unit 7 outputs a multiple adjusted edge images having mutually different resolutions to the image reconstruction unit 8.

The image reconstruction unit 8 (image combination unit) receives the multiple adjusted edge images having mutually different resolutions and reconstructs an image. The image reconstruction unit 8 acquires, from the change amount adjustment unit 7, the multiple adjusted edge images having mutually different resolutions. The image reconstruction unit 8 combines the multiple adjusted edge images having mutually different resolutions to reconstruct the original resolution luminance image.

The image reconstruction unit 8 acquires the original resolution color image from the image input unit 2. The image reconstruction unit 8 combines the reconstructed original resolution luminance image and the original resolution color image. The image reconstruction unit 8 outputs the combined image to a predetermined external device as an image finally adjusted by using the video magnification.

Next, the image processing apparatus 1 will be described in detail.

The image input unit 2 receives a multiple frames of the moving image as the image processing target. The image input unit 2 generates, an original resolution luminance image "I(x, y, t)" and an original resolution color image from the multiple acquired frames. "x" represents an x-coordinate in the frame of the moving image (such as the luminance image or the like). "y" represents a y-coordinate in the frame of the moving image (such as the luminance image). "t" represents a time of a frame of a time-series moving image. The image input unit 2 outputs the original resolution luminance image "I(x, y, t)" to the image decomposition unit 30. The image input unit 2 outputs an original resolution color image to the image reconstruction unit 8.

The image decomposition unit 30 receives a luminance image of a multiple frames of the moving image. The image decomposition unit 30 sets the luminance image "I(x, y, t)" having original resolution as a luminance image "$I^0$(x, y, t)" having the 0th resolution (highest resolution) as in Equation (1).

[Equation 1]

$$I^0(x,y,t) = I(x,y,t) \quad (1)$$

The image decomposition unit 30 executes processing of dividing a spatial frequency band (band division processing) on luminance images having multiple resolutions. That is, the image decomposition unit 30 executes edge detection processing on the luminance images having the multiple resolutions. Accordingly, the image decomposition unit 30 generates edge images (band-divided images) of the luminance images having the multiple resolutions by the edge detection processing.

The method for generating the edge images is not limited to a particular method. For example, the image decomposition unit 30 generates the edge images by using a band-division filter (edge filter) such as a differential filter or a high-pass filter for the luminance images. For example, the image decomposition unit 30 may generate the edge images by executing wavelet transform (octave division) on the luminance images. Hereinafter, the image decomposition unit 30 generates difference images as an example of the edge images. The image decomposition unit 30 generates a difference image "$L^n$(x, y, t)" by using downsampling and a Gaussian filter as follows.

Figure 2:
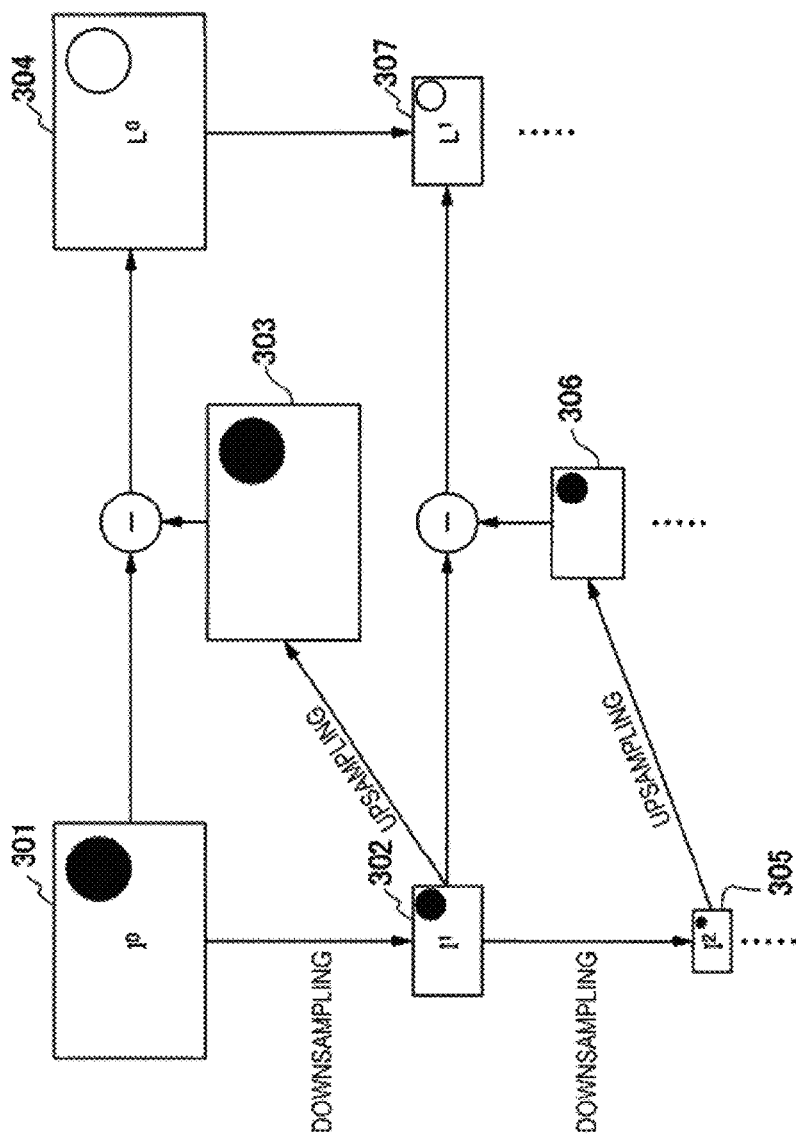
FIG. 2 is a diagram illustrating an example of generation of a difference image in the first embodiment.

FIG. 2 is a diagram illustrating an example of generation of a difference image. The luminance image 301 is a luminance image having 0th resolution (highest resolution). The image decomposition unit 30 executes downsampling on the luminance image 301 to generate a luminance image 302. The image decomposition unit 30 executes upsampling on the luminance image 302 to generate a luminance image 303. The image decomposition unit 30 derives a difference between the luminance image 301 and the luminance image 303 having the 0th resolution to generates a difference image 304 having the 0th resolution.

The image decomposition unit 30 executes downsampling on the luminance image 302 to generate a luminance image 305. The image decomposition unit 30 executes upsampling on the luminance image 305 to generate a luminance image 306. The image decomposition unit 30 derives a difference between the luminance image 302 and the luminance image 306 having the 0th resolution to generates a difference image 307 having first resolution. Thus, the image decomposition unit 30 generates the multi-resolution edge image based on the multi-resolution luminance image.

The image decomposition unit 30 executes downsampling on a luminance image "$I^{n-1}$(x, y, t)" having a (n−1)-th predetermined resolution. The number of levels of resolutions is three or more, for example, eight. When the number of levels of resolution is defined as eight levels, the image decomposition unit 30 executes downsampling on the original resolution luminance image seven times.

The image decomposition unit 30 convolutes a Gaussian filter "$G_\sigma$(x, y)" with the downsampling result. The number of levels of the resolution of the luminance image is defined according to a filter size of the Gaussian filter. That is, a minimum size of a block defined in the luminance image is defined according to the filter size of the Gaussian filter. The image decomposition unit 30 generates multi-resolution luminance images ("$I^0$(x, y, t)", ... "$I^n$(x, y, t)") by repeating a computation represented in Equation (2) on the luminance images having the first to n-th highest resolutions. Hereinafter, an operator including an "x" mark in a mark "○" among operators represented in the equation is a convolutional operator.

[Equation 2]

$$I^n(x,y,t) = G_\sigma(x,y) \otimes \text{downsample}(I^{n-1}(x,y,t)) \quad (2)$$

The right side of Equation (2) represents a convolutional computation of "$G_\sigma$(x, y)" and "downsample ($I^{n-1}$(x, y, z))". "$G_\sigma$(x, y)" represents a two-dimensional Gaussian filter having a variance "$\sigma^2$". "downsample (Z)" represents processing of reducing an image having a resolution "Z" based on the amount of downsample (downsampling). The amount of downsample is a fraction, for example, ½. Hereinafter, "n" is an integer of 0 or more and N or less. N is a predetermined integer of 2 or more. In this way, the image decomposition unit 30 may execute predetermined interpolation processing on the luminance images on which reduction processing is executed.

The image decomposition unit 30 executes upsampling on the luminance image "$I^{n+1}$(x, y, t)" having an "n+1"-th highest resolution. Accordingly, the image decomposition unit 30 aligns the resolution of the luminance image "$I^{n+1}$(x, y, t)" having the "n+1"-th highest resolution with the n-th predetermined resolution. That is, the image decomposition unit 30 uses the luminance image "$I^{n+1}$(x, y, t)" having the "n+1"-th highest resolution as the luminance image "upsample ($I^{n+1}$(x, y, t))" having the "n (=n+1−1)"-th highest resolution. "upsample(X)" indicates a process (upsampling) of magnifying an image having resolution "X" so that the image matches the n-th resolution.

The difference image "$L^n$(x, y, t)" (difference image in the resolution direction) between the luminance image "$I^n$(x, y, t)" having the n-th highest resolution and the luminance image "upsample ($I^{n+1}$(x, y, t))" having the n-th highest resolution represented in Equation (2) is represented as in Equation (3).

[Equation 3]

$$L^n(x, y, t) = \begin{cases} I^n(x, y, t) - upsample(I^{n+1}(x, y, t)) & (n < N) \\ I^n(x, y, t) & (n = N) \end{cases} \quad (3)$$

Each functional unit of the image processing apparatus 1 executes predetermined image processing on the difference image "$L^n(x, y, t)$" having the n-th ($0 \leq n < N$) resolution.

The image conversion unit 31 receives the difference image "$T(x, y, t)$" having n-th resolution. The image conversion unit 31 converts the luminance change occurring according to the direction change in a processing region (x, y) included in the difference image "$L^n(x, y, t)$" to a phase change and an amplitude change of the luminance information in the same direction change.

For example, the image conversion unit 31 detects the phase change in a time direction in the difference image in order from a low (coarse) resolution to a high (fine) resolution. That is, the image conversion unit 31 executes processing of detecting the phase change in the time direction in the difference image having the low resolution earlier than processing of detecting the phase change in the difference image having the high resolution.

A method by which the image conversion unit 31 converts the luminance change occurring according to the direction change to the phase change and the amplitude change is not limited to a specific method. Hereinafter, the image conversion unit 31 converts the luminance change occurring according to the direction change to the phase change and the amplitude change occurring according to the same direction change through the Riesz transform as an example.

The image conversion unit 31 executes, for example, a Fourier transform "fft" and an inverse Fourier transform "ifft" for the difference image "$L^n(x, y, t)$" having n-th resolution. That is, the image conversion unit 31 executes the Riesz transform on the difference image "$L^n(x, y, t)$" as in Equations (4) to (9).

[Equation 4]

$$F(\omega_x, \omega_y) = \mathit{fft}(L^n(x, y, t)) \tag{4}$$

[Equation 5]

$$R_1 = \mathit{ifft}\left(F(\omega_x, \omega_y) * -i\frac{\omega_x}{|\omega|}\right) \tag{5}$$

[Equation 6]

$$R_2 = \mathit{ifft}\left(F(\omega_x, \omega_y) * -i\frac{\omega_y}{|\omega|}\right) \tag{6}$$

In Equation (4) to Equation (6), relationships from Equation (7) to Equation (9) are established.

[Equation 7]

$$L^n(x,y,t) = A^n(x,y,t) \cdot \cos(\phi^n(x,y,t)) \tag{7}$$

[Equation 8]

$$R_1 = A(x,y,t) \cdot \sin(\phi^n(x,y,t))\cos(\theta^n(x,y,t)) \tag{8}$$

[Equation 9]

$$R_2 = A(x,y,t) \cdot \sin(\phi^n(x,y,t))\sin(\theta^n(x,y,t)) \tag{9}$$

Here, "$\theta_n(x, y, t)$" indicates a direction change in the pixel at the coordinates (x, y) in the difference image "$L^n(x, y, t)$" having n-th resolution. "$\Phi^n(x, y, t)$" indicates a phase change occurring according to the direction change "$\theta_n(x, y, t)$". "$A^n(x, y, t)$" indicates an amplitude change occurring according to the direction change "$\theta^n(x, y, t)$". The phase change "$\Phi^n(x, y, t)$" occurring according to the direction change "$\theta^n(x, y, t)$" is expressed as in Equation (10). The image conversion unit 31 outputs information on the phase change "$\Phi^n(x, y, t)$" occurring according to the direction change "$\theta^n(x, y, t)$" to the change detection unit 4.

[Equation 10]

$$\phi^n(x, y, t) = \tan^{-1}\left(\frac{\sqrt{R_1^2 + R_2^2}}{L^n(x, y, t)}\right) \tag{10}$$

The change detection unit 4 receives the information on the phase change "$\Phi^n(x, y, t)$" occurring according to the direction change "$\theta^n(x, y, t)$". The change detection unit 4 convolutes a temporal filter "H(t)" with the phase change "$\Phi^n(x, y, t)$". Accordingly, the change detection unit 4 detects subtle changes in the phase change "$\Phi^n(x, y, t)$". The temporal filter "H(t)" is not limited to a particular filter as long as a temporal filter having a frequency response to the phase change (for example, subtle phase change) according to the direction change as an adjustment target (an emphasis or attenuation target) is used. The temporal filter "H(t)" is, for example, a band-pass filter (see Non Patent Document 1).

The change detection unit 4 may multiply the phase change according to the direction change (for example, a subtle phase change) by a spatiotemporal filter "J(x, y, t)". Through the multiplication, the change detection unit 4 may remove a sharp phase change (non-gentle phase change) for a time and a space in the difference image "$L^n(x, y, t)$" having the n-th highest resolution.

The spatiotemporal filter "J(x, y, t)" is not limited to a particular filter as long as a spatiotemporal filter that removes the sharp phase change is used. The spatiotemporal filter "J(x, y, t)" is, for example, a jerk filter (see Non Patent Document 2). For example, the change detection unit 4 detects and normalizes a non-subtle and sharp change by performing third-order differential on the subtle change. The detection and normalization result is 0 when the subtle change appears, and is 1 when the sharp change appears. Accordingly, the inverse of the detection and normalization result is 1 when the subtle change appears, and is 0 when the sharp change appears. The change detection unit 4 uses, as the jerk filter, the inverse of the detection and normalization result.

The change detection unit 4 executes computations on the phase change in order of the third-order differential, the normalization, and the inversion. Accordingly, the change detection unit 4 may generate the jerk filter that removes only the non-subtle and sharp phase change. The change detection unit 4 multiplies an original phase change by the jerk filter.

In other words, the change detection unit 4 executes the computations of the third-order differential and the normalization on the phase change. Accordingly, when the subtle phase change appears in the difference image, the change detection unit 4 obtains a computation result having a value of 0. When the sharp phase change appears in the difference image, the change detection unit 4 obtains a computation result having a value of 1.

The change detection unit 4 generates the jerk filter by inverting the computation result. When the subtle phase change appears in the difference image, the jerk filter has a filter response of a value of 1. When the sharp phase change appears in the difference image, the jerk filter has a filter response of a value of 0. The change detection unit 4 multiplies an original phase change by the jerk filter "J". When the subtle phase change appears in the difference image, the original phase change is multiplied by the value of 1, and thus, the change detection unit 4 may detect only the subtle phase change. When the sharp phase change appears in the difference image, the original phase change is multiplied by the value of 0, and thus, the change detection unit 4 may suppress the sharp phase change.

The gentle and subtle phase change "$C^n(x, y, t)$" is represented as in Equation (11). An operator "$\bigcirc$" represented in Equation (11) represents multiplication (element-wise product).

[Equation 11]

$$C^n(x,y,t)=J(x,y,t)\circ(H(t)\otimes\varphi^n(x,y,t)) \tag{11}$$

Here, the subtle phase change "$C^n(x, y, t)$" shown in Equation (11) includes a meaningful subtle phase change "$\hat{C}^n(x, y, t)$" and a meaningless subtle phase change "$\tilde{C}^n(x, y, t)$", as in Equation (12). Here, the meaningless subtle phase change (motion change) is a phase change occurring in the pixel value of the image due to random noise mixed in the image due to thermal noise, camera shake, ground vibration, or the like of the image sensor. A meaningful subtle phase change (motion change) is a phase change that occurs in the pixel value of the image due to a physical phenomenon (for example, incidence of light on the image sensor) other than random noise.

[Equation 12]

$$C^n(x,y,t)=\hat{C}^n(x,y,t)+\tilde{C}^n(x,y,t) \tag{12}$$

The reliability estimation unit 5 receives the direction change information. The reliability estimation unit 5 estimates reliability of the subtle phase change "$C^n(x, y, t)$" based on the direction change "$\theta^n(x, y, t)$". This makes it possible for the reliability estimation unit 5 to separate the meaningful subtle phase change "$\hat{C}^n(x, y, t)$" and meaningless subtle phase change "$\tilde{C}^n(x, y, t)$" in the subtle phase change "$C^n(x, y, t)$".

In the time width "$(-)t$" including time t, the meaningful subtle phase change occurs in a limited spatial direction in the edge image as compared to the meaningless subtle phase change. Thus, a variance value of a time-series direction change "$\theta^n(x, y, (-)t)$" in the pixel at the coordinates (x, y) is small.

Thus, the reliability estimation unit 5 estimates the reliability "$mask^n(x, y, t)$" of the subtle phase change as in Equation (13) based on the variance value of the time-series direction change "$\theta^n(x, y, (-)t)$" in the time width "$(-)t$". The reliability of subtle phase changes is higher when the variance value of time-series direction change becomes smaller.

[Equation 13]

$$mask^n(x,y,t)=(1-\text{Norm}(G_\sigma\otimes\text{Var}(\theta^n(x,y,\bar{t})) \tag{13}$$

Here, "Norm (X)" indicates that a value of the argument "X" is normalized to a range from 0 to 1. The method of normalization is not limited to a specific method. "Var(X)" indicates a variance value of the argument "X" in the time width "$(-)t$". "$G_\sigma$" indicates a function for spatially smoothing Var($\theta^n(x, y, (-)t)$). The parameter "$\sigma$" indicates a strength of spatial smoothing. A parameter "$\gamma$" indicates the reliability.

In the reliability "$mask^n(x, y, t)$", only the variance value of the time-series direction change "$\theta^n(x, y, (-)t)$" at the coordinates (x, y) that is not a region is considered. Thus, when momentary noise is mixed in the pixel value of the pixel at the coordinates (x, y), estimation accuracy of the variance value is likely to be lowered. Thus, the reliability estimation unit 5 estimates a variance-covariance matrix as in Equations (14) and (15) for a region including the pixel at the coordinates (x, y). That is, the reliability estimation unit 5 estimates the reliability based on a behavior of the direction change "$\theta(x, y, t)$" in the region including the pixel at the coordinates (x, y).

[Equation 14]

$$D=\text{cov}(\theta^n(\theta^n(\bar{x},t)) \tag{14}$$

[Equation 15]

$$\bar{x}\in\mathbb{R}^{h\times w}=\mathbb{R}^{d=1} \tag{15}$$

Here, "$(-)x$" indicates the region including the pixel at the coordinates (x, y). "cov(X)" indicates a function (a function for extending a dimension) that generates the variance-covariance matrix "D" of the matrix "X". "d" indicates the number of pixels (number of samples) in the region. "w" indicates a length of the region in a horizontal direction (x-axis direction). "h" indicates a length of the region in a vertical direction (y-axis direction).

The reliability estimation unit 5 executes eigen decomposition for the variance-covariance matrix "D". The reliability estimation unit 5 estimates, as illustrated in Equation (16), the reliability "$maskS^n(x, y, t)$" of the subtle phase change in the region including the coordinates (x, y) as shown in Equation (15) based on the average "$(-)$" of the eigenvalues "$\lambda_1, \ldots, \lambda_d$" of the variance-covariance matrix "D". The reliability "$maskS^n(x, y, t)$" indicates the reliability of the subtle phase change in the region "S" including the coordinates (x, y) in a range of 0 to 1.

[Equation 16]

$$maskS^n(x,y,t)=(1-\text{Norm}(G_\sigma\otimes\bar{\lambda}) \tag{16}$$

The multiplication unit 6 multiplies the reliability "$maskS^n(x, y, t)$" shown in Equation (16) by "$C^n(x, y, t)$" shown in Equation (11) as in Equation (17).

[Equation 17]

$$\hat{C}^n(x,y,t)=maskS^n(x,y,t)\circ C^n(x,y,t) \tag{17}$$

The multiplication unit 6 may multiply the reliability "$mask^n(x, y, t)$" of the subtle phase change at the coordinates (x, y) of the pixel by "$C^n(x, y, t$" shown in Equation (11).

Through the multiplication, the subtle phase change "$\hat{C}^n(x, y, t)$" occurring in the pixel value of the pixel in the image due to the physical phenomenon other than the random noise is detected with high accuracy. The multiplication unit 6 can detect the subtle phase change "$\vec{C}^n(x, y, t)$" in which the variance values are uniform.

The change amount adjustment unit 7 acquires information on the gentle and subtle phase change "$\vec{C}^n(x, y, t)$" in the difference image "$L^n(x, y, t)$" having the n-th resolution from the multiplication unit 6 as a meaningful phase change. The change amount adjustment unit 7 multiplies the gentle and subtle phase change "$\vec{C}^n(x, y, t)$" by a predetermined adjustment rate (emphasis rate) "$\alpha$". That is, the change amount adjustment unit 7 multiplies the subtle phase change derived with high accuracy as in Equation (17) by a predetermined adjustment rate (emphasis rate) a as in Equation (18). The change amount adjustment unit 7 adds the original phase change "$\Phi^n(x, y, t)$" to the multiplication result to derive the phase change "$\hat{\Phi}^n(x, y, t)$" in which an amount of change in the gentle and subtle phase change in the direction change determined for each pixel in a time-series edge image has been adjusted, as in Equation (18).

[Equation 18]

$$\hat{\phi}''(x,y,t) = \phi''(x,y,t) + \alpha \cdot \hat{C}''(x,y,t) \tag{18}$$

Thus, the change amount adjustment unit 7 adjusts an amount of change in the detected subtle phase change. The adjustment rate may be the same or different for each resolution, direction, time, or position.

When a subtle phase change is emphasized, the predetermined adjustment rate "α" is set to a positive value. When the subtle phase change is attenuated, the predetermined adjustment rate "α" is set to a negative value. An upper limit value and a lower limit value of "α" may not be specifically determined. However, for example, when the subtle phase change is attenuated, a value of "α" becomes the lower limit of "α" when a value of the original phase change "Φ"(x, y, t)" becomes 0. When "α" is set to 0, the phase change is not adjusted.

The image reconstruction unit 8 generates a difference image "^L_n(x, y, t)" having the n-th highest resolution in which the amount of change in the gentle and subtle motion change is adjusted based on the phase change "^Φ"(x, y, t)" in which the amount of change is adjusted as in Equation (19). That is, the image reconstruction unit 8 generates the adjusted difference image "^L"(x, y, t)" having the n-th (0≤n≤N) highest resolution based on the phase change "^Φ"(x, y, t)" in which the amount of change is adjusted and the amplitude change "A"(x, y, t)" as in Equation (19).

[Equation 19]

$$\hat{L}''(x,y,t) = A''(x,y,t) \cdot \cos(\hat{\phi}''(x,y,t)) \tag{19}$$

The image reconstruction unit 8 acquires the color image from the image input unit 2. The image reconstruction unit 8 sequentially executes the processing represented in Equation (20) for the resolution number "n" based on Equations (3) and (19). The image reconstruction unit 8 reconstructs the luminance image "^I^{n-1}(x, y, t)" having the "n−1"-th highest resolution based on the adjusted difference image "^I^{n-1}(x, y, t)" having the "n−1"-th highest resolution and the luminance image "^L^{n-1}(x, y, t)" having the "n−1"-th highest resolution as in Equation (20).

[Equation 20]

$$\hat{I}^{n-1}(x,y,t) = \hat{L}^{n-1}(x,y,t) + \text{upsample}(\hat{I}''(x,y,t)) \tag{20}$$

Here, "upsample(X)" indicates a process (upsampling) of magnifying an image having resolution "X" so that the image matches the n-th resolution. The image reconstruction unit 8 reconstructs the luminance image having the original resolution (0th highest resolution) by sequentially executing the processing represented in Equation (20) for "n". The image reconstruction unit 8 combines the reconstructed original resolution luminance image "^I"(x, y, t)" and the original resolution color image. The image reconstruction unit 8 outputs the combination result to a predetermined external device as an image finally adjusted by using the video magnification.

The predetermined external device is, for example, a device that executes image processing other than the video magnification, a device that executes image recognition (hereinafter, referred to as an "image recognition device"), or a display device. When the predetermined external device is the image recognition device, the image recognition device may use, as a feature for image recognition, the combination result (image finally adjusted by using the video magnification).

Figure 3:
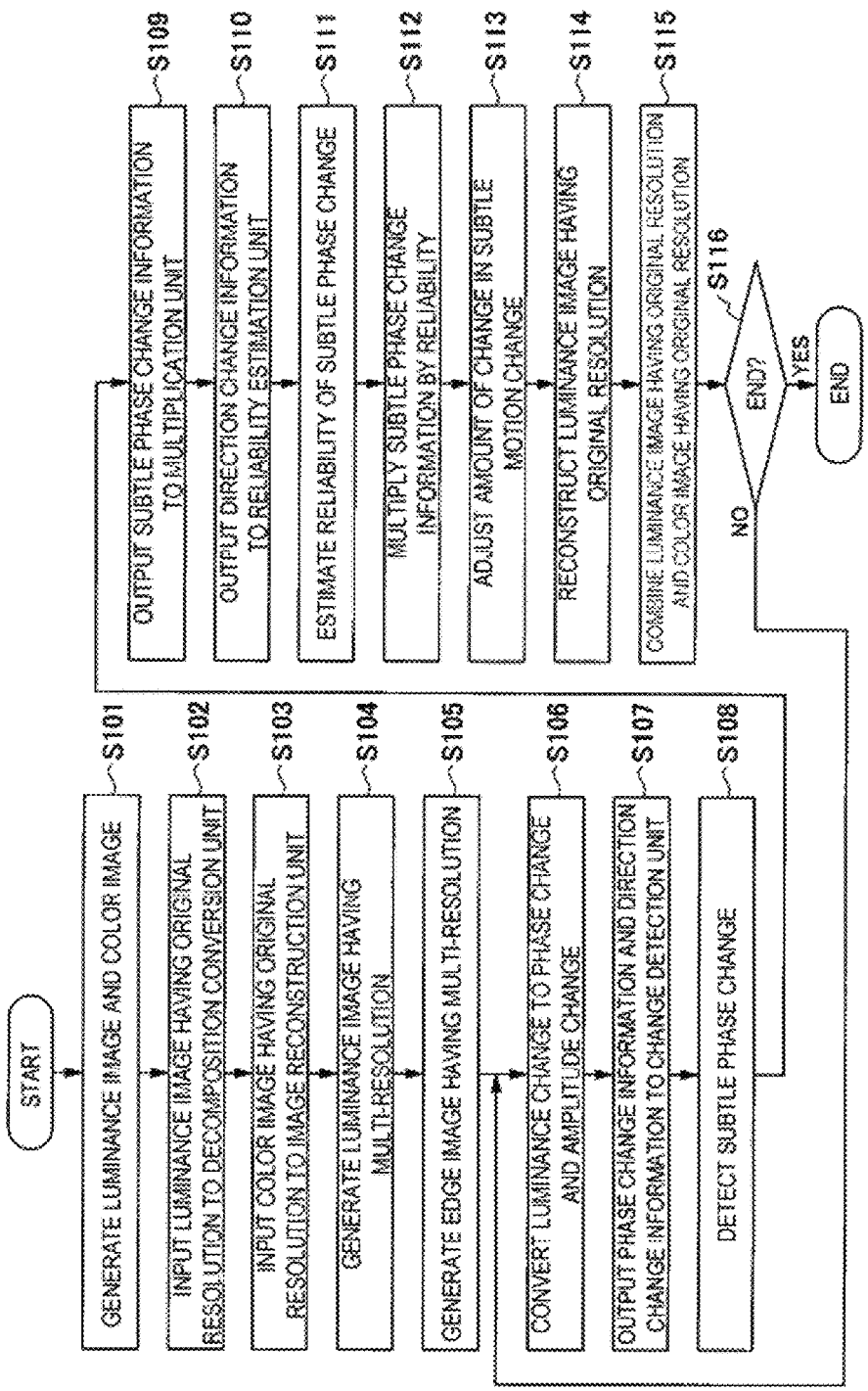
FIG. 3 is a flowchart illustrating an operation example of the image processing apparatus according to the first embodiment.

Next, an operation example of the image processing apparatus 1 will be described. FIG. 3 is a flowchart illustrating the operation example of the image processing apparatus 1. The image input unit 2 generates the luminance images and the color images from the multiple frames of the moving image (step S101). The image input unit 2 outputs the original resolution luminance image to the decomposition conversion unit 3 (step S102). The image input unit 2 outputs the original resolution color image to the image reconstruction unit 8 (step S103).

The image decomposition unit 30 generates a multi-resolution luminance image from the original resolution luminance image (step S104). The image decomposition unit 30 generates the multi-resolution edge image from the multi-resolution luminance image (step S105).

The image conversion unit 31 converts the luminance change occurring according to the direction change in the pixel in the edge image having a time width including time t to the phase change and the amplitude change occurring according to the same direction change (step S106).

The image conversion unit 31 outputs the phase change information and the direction change information of the multi-resolution edge image to the change detection unit 4 for each pixel in the edge image (step S107).

The change detection unit 4 detects a subtle phase change occurring according to the direction change in the pixels in the edge image (step S108). The change detection unit 4 outputs the subtle phase change information to the multiplication unit 6 (step S109). The change detection unit 4 outputs the direction change information to the reliability estimation unit 5 (step S110).

The reliability estimation unit 5 estimates the reliability "maskS'''" of the subtle phase change "C"(x, y, t)" occurring according to the direction change based on the variance value of the time-series direction change (step S111). The multiplication unit 6 multiplies the subtle phase change information by the estimated reliability (step S112). The change amount adjustment unit 7 adjusts the amount of change in subtle motion change multiplied by the reliability as in Equation (17) through emphasis or attenuation as in Equation (18) (step S113).

The image reconstruction unit 8 reconstructs the original resolution luminance image based on the multiple adjusted edge images having mutually different resolutions (step S114). The image reconstruction unit 8 combines the reconstructed original resolution luminance image and the original resolution color image (step S115).

The image conversion unit 31 determines whether the image processing apparatus 1 ends the processing based on, for example, an instruction obtained from the user (step S116). When the image processing apparatus 1 continues the processing (step S116: NO), each functional unit of the image processing apparatus 1 returns the processing to step S106. When the image processing apparatus 1 ends the processing (step S116: YES), each functional unit of the image processing apparatus 1 ends the processing.

Next, an example of a result of adjusting the amount of change in the motion change (phase change) of the image will be described.

Figure 4:
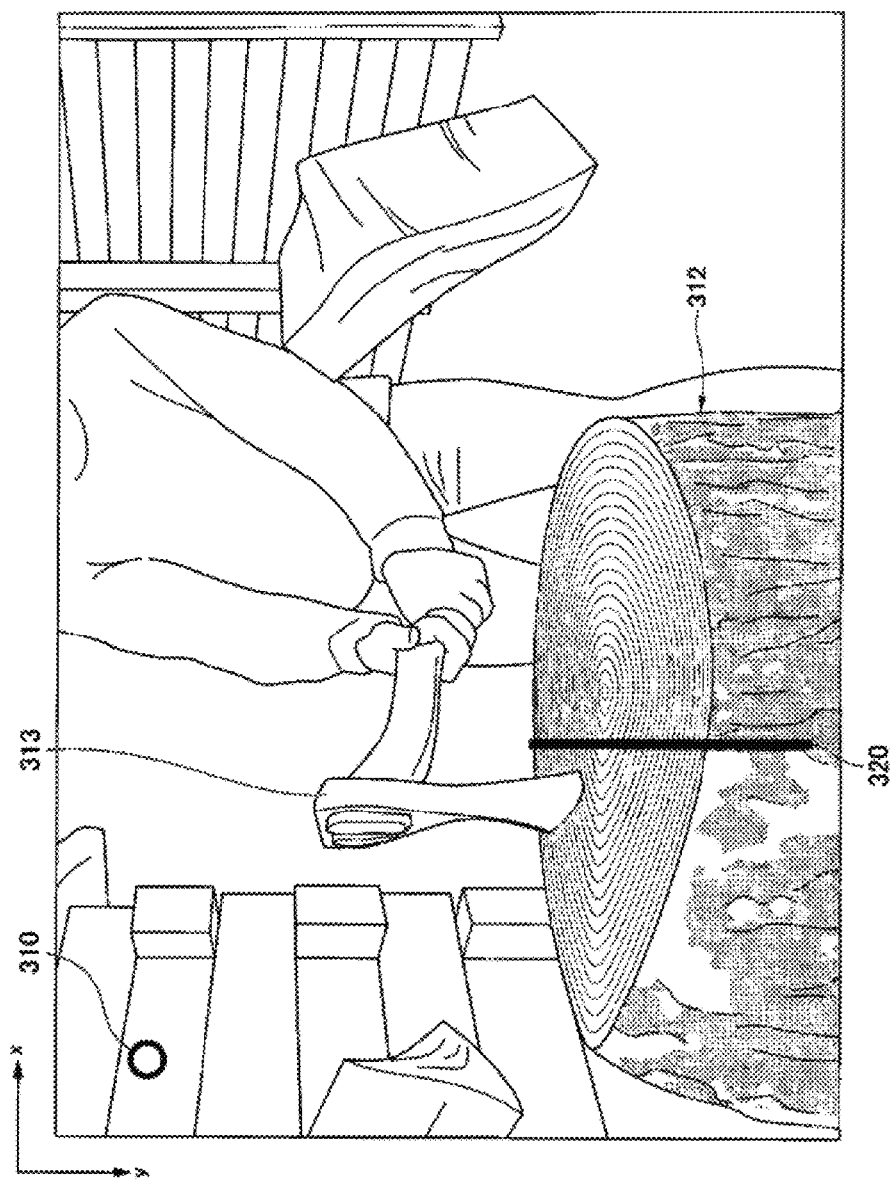
FIG. 4 is a diagram illustrating an example of a frame of a moving image in the first embodiment.

FIG. 4 is a diagram illustrating an example of a frame of a moving image. In the frame illustrated in FIG. 4, a motion of an ax being lowered onto a stump (the motion of chopping wood) is imaged. In the time-series frame after the time when the ax collides with the stump, the stump vibrates slightly in the y-axis direction.

The frame illustrated in FIG. 4 includes a pixel group 320 and pixels 321. The pixel group 320 consists of pixels arranged in a vertical direction (y-axis direction) in a stump image 312 captured in a first partial region in the frame. A pixel 321 is a pixel included in an image of a wall captured in a second partial region in the frame.

In the frame of the moving image, a subtle phase change in a random spatial direction normally occurs due to random noise in a pixel value of a pixel 321 of the image of the wall. When the ax is lowered toward the stump in the y-axis direction, a subtle phase change in the y-axis direction mainly occurs due to a vibration of the stump image 312 in the pixel value of the pixel group 320 of the stump image 312 because of the collision between the stump and the ax.

Figure 5:
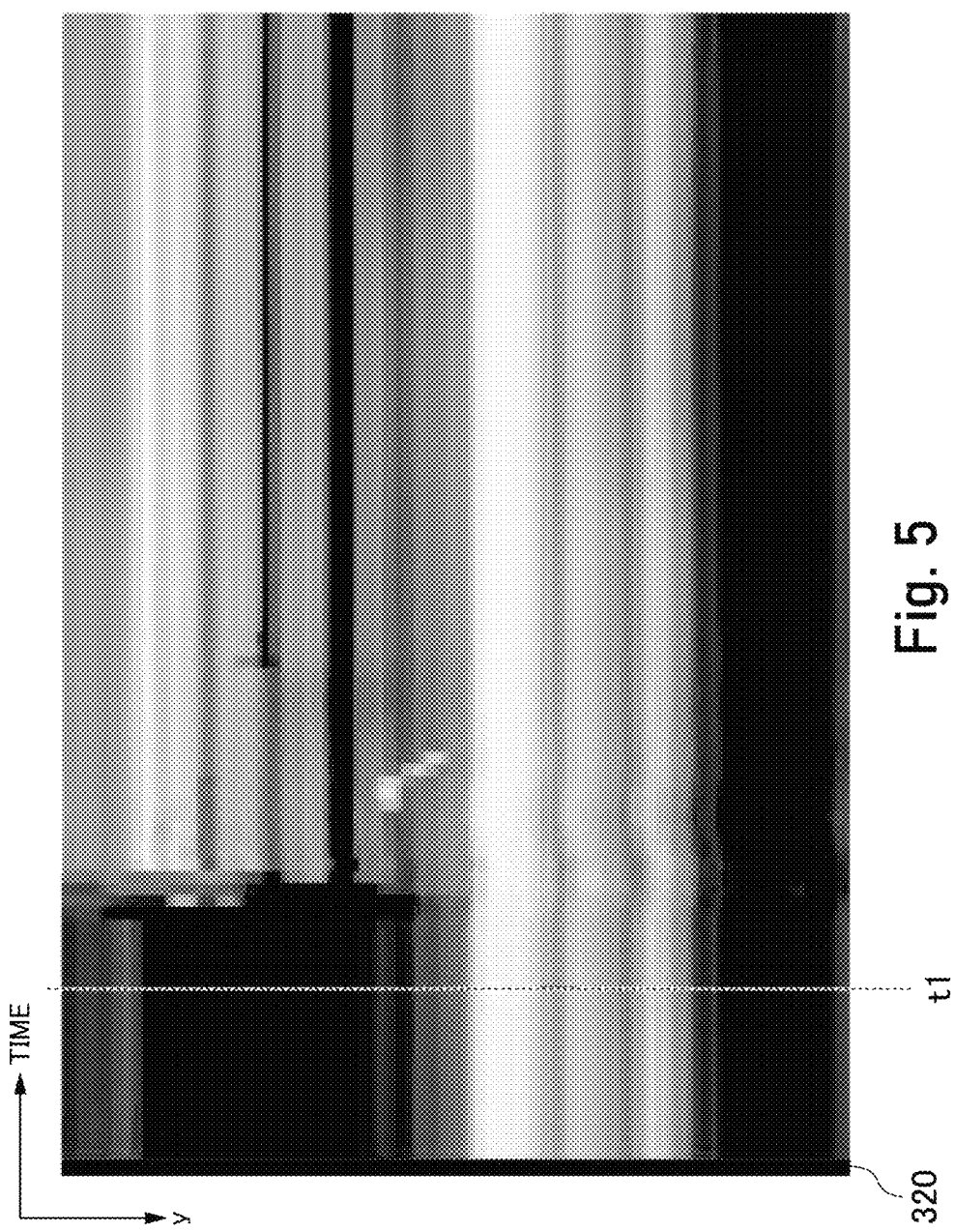
FIG. 5 is a diagram illustrating an example of a change in a pixel value of a pixel group of an original image in the first embodiment.
Figure 6:
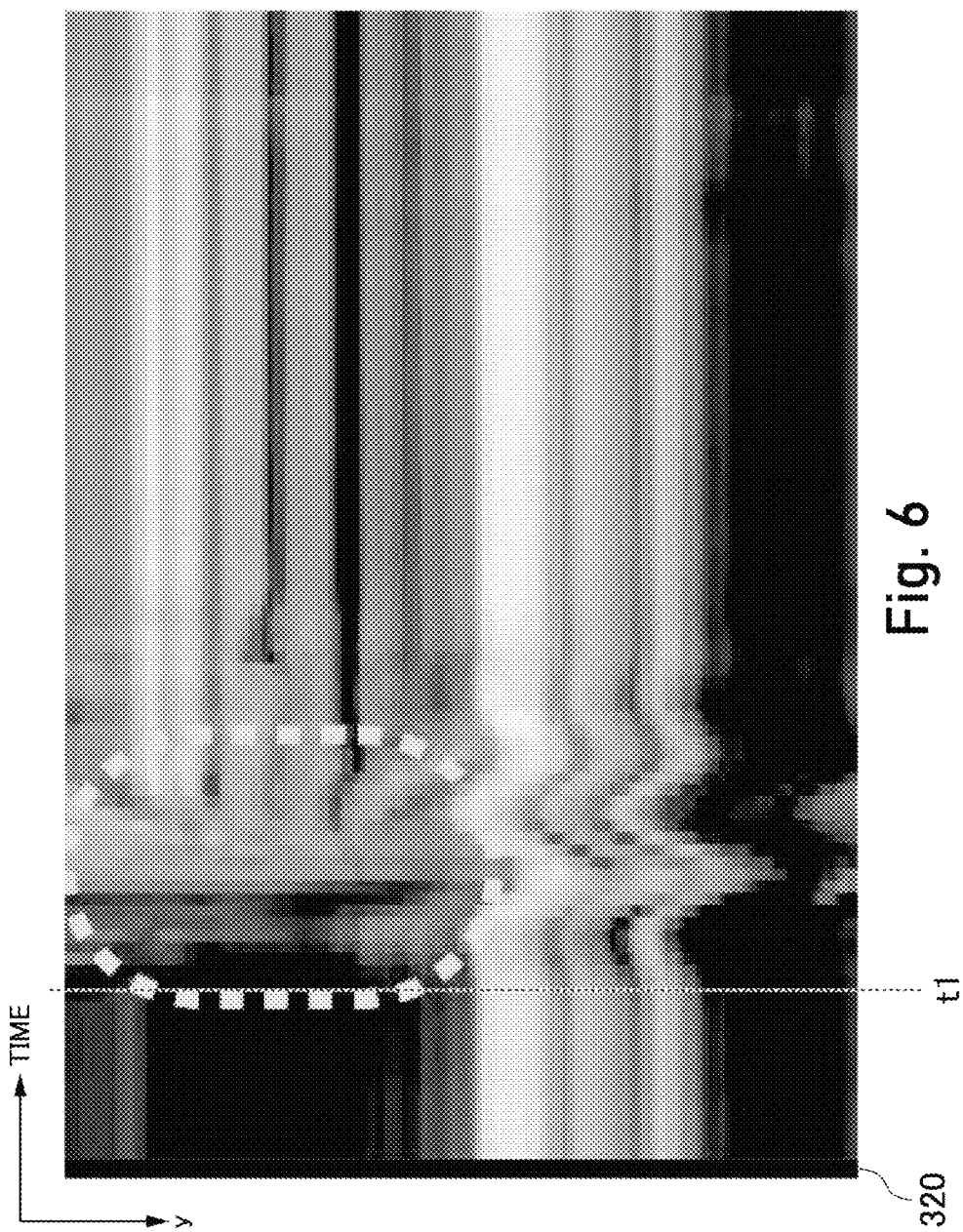
FIG. 6 is a diagram illustrating an example of pixel value of a pixel group in which an amount of change in motion change has been adjusted based on an acceleration method in the first embodiment.
Figure 7:
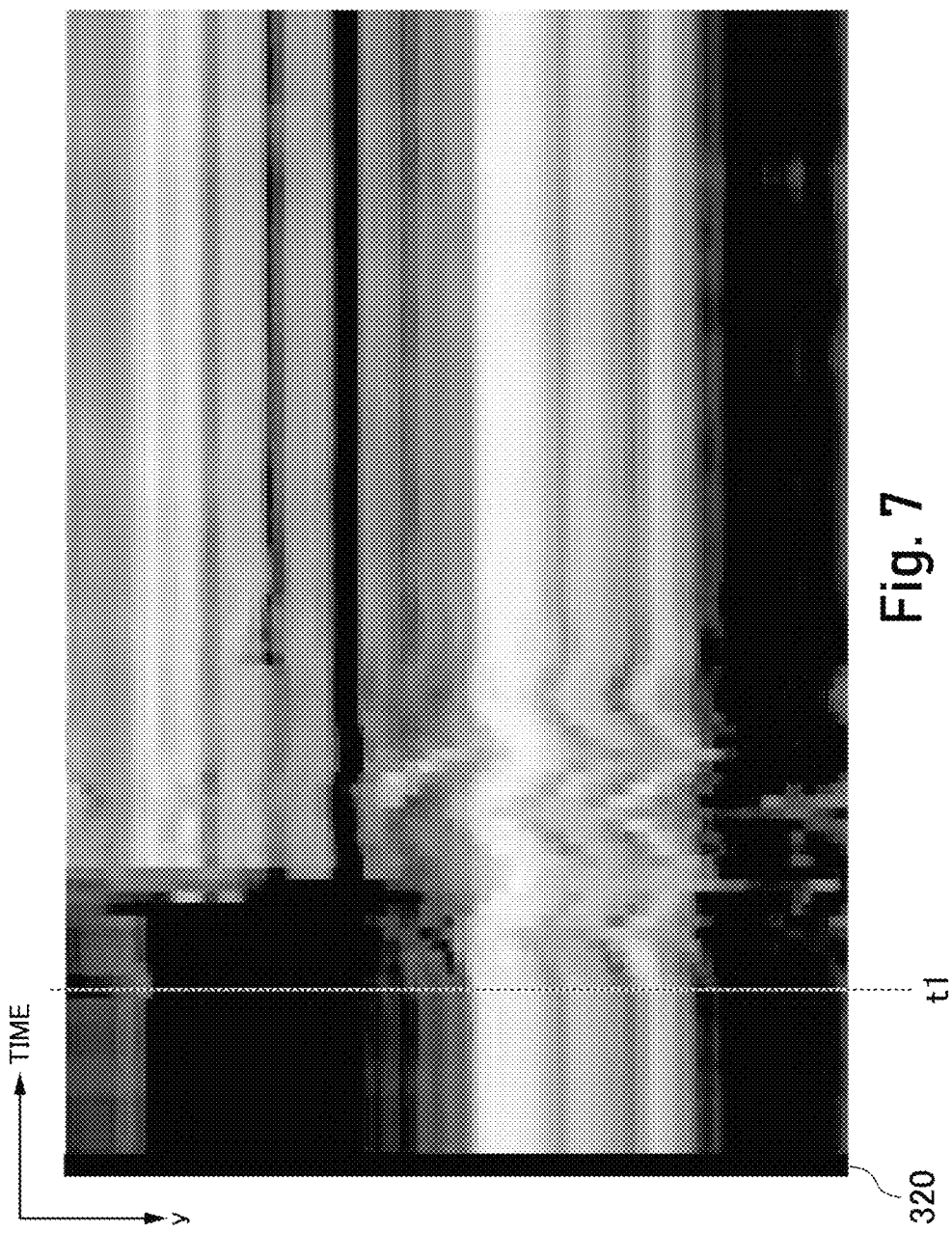
FIG. 7 is a diagram illustrating an example of pixel values of a pixel group in which the amount of change in motion change has been adjusted based on a jerk method in the first embodiment.
Figure 8:
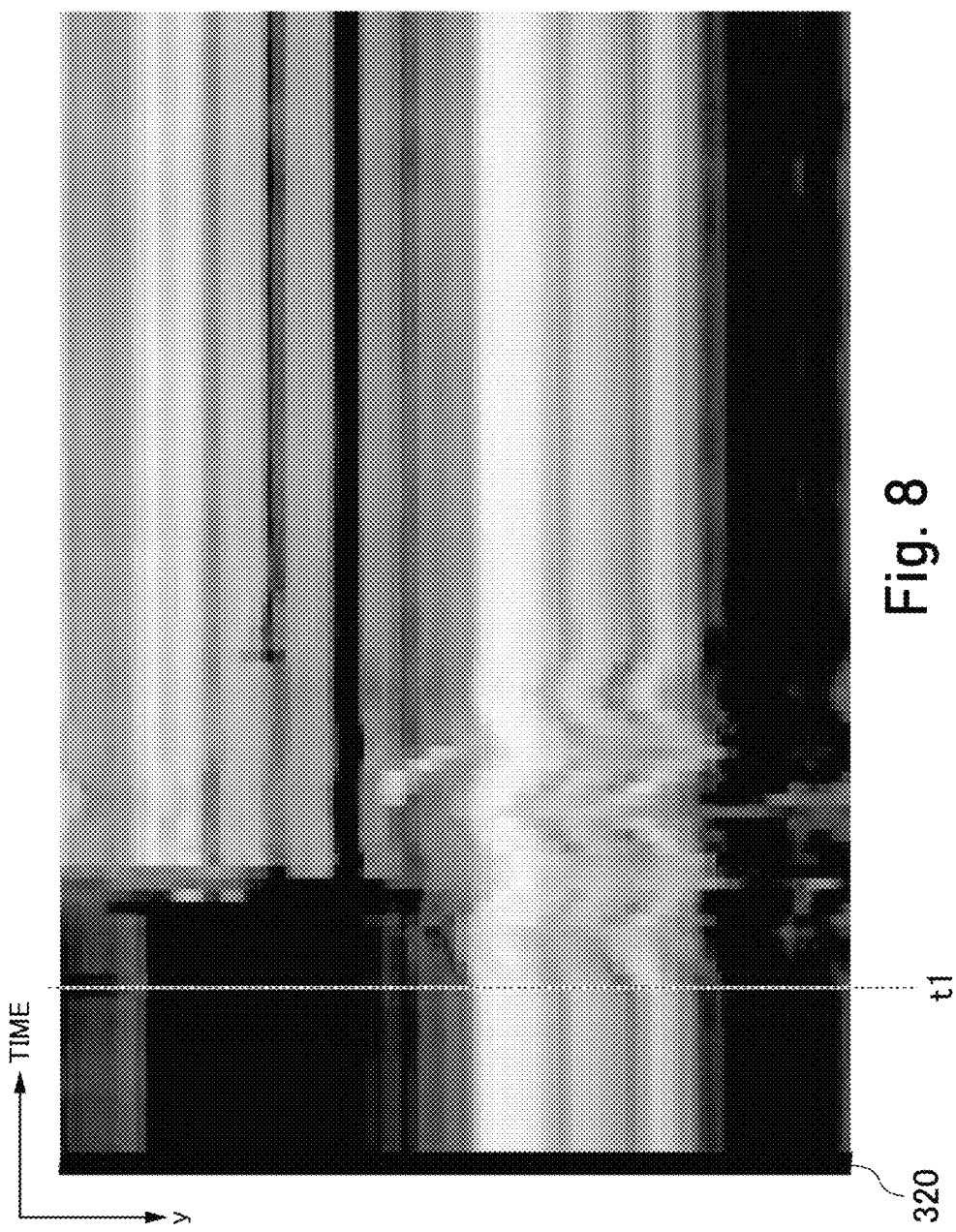
FIG. 8 is a diagram illustrating an example of a pixel value of a pixel group in which the amount of change in motion change has been adjusted based on a variance value of direction change per unit time in the first embodiment.

FIGS. 5, 6 and 7 illustrate images for comparison with FIG. 8. A horizontal axis indicates time. A vertical axis indicates each pixel value of the pixel group 320 in the frame of the moving image illustrated in FIG. 4.

FIG. 5 is a diagram illustrating an example of change in the pixel value of the pixel group 320 of the original image. In FIG. 5, an amount of change in subtle motion change is not adjusted. Thus, the amount of change in each pixel value (motion change) of the pixel group 320 is small before and after time "t" when the stump and the ax collide.

FIG. 6 is a diagram illustrating an example of a pixel value of the pixel group 320 in which the amount of change in motion change has been adjusted based on the acceleration method. In FIG. 6, the amount of change in motion change is adjusted based on the acceleration method, and the random noise is magnified based on an acceleration. Thus, the amount of change in the pixel value (motion change) is large after time "t" when the stump and the ax collide (a region surrounded by a broken line). In this case, quality of the moving image deteriorates due to the magnified (emphasized) random noise.

FIG. 7 is a diagram illustrating an example of a pixel value of the pixel group 320 in which the amount of change in motion change has been adjusted based on a jerk method. In FIG. 7, the amount of change in motion change is magnified based on the jerk method. Thus, the amount of change in the pixel value (motion change) is large after time "t1" when the stump and the ax collide.

FIG. 8 is a diagram illustrating an example of the pixel value of the pixel group 320 in which the amount of change in motion change has been adjusted based on the variance value of the direction change per unit time. In FIG. 8, the amount of change in motion change is magnified based on the variance value. Thus, the amount of change in the pixel value (motion change) is large after time "t1" when the stump and the ax collide.

Figure 9:
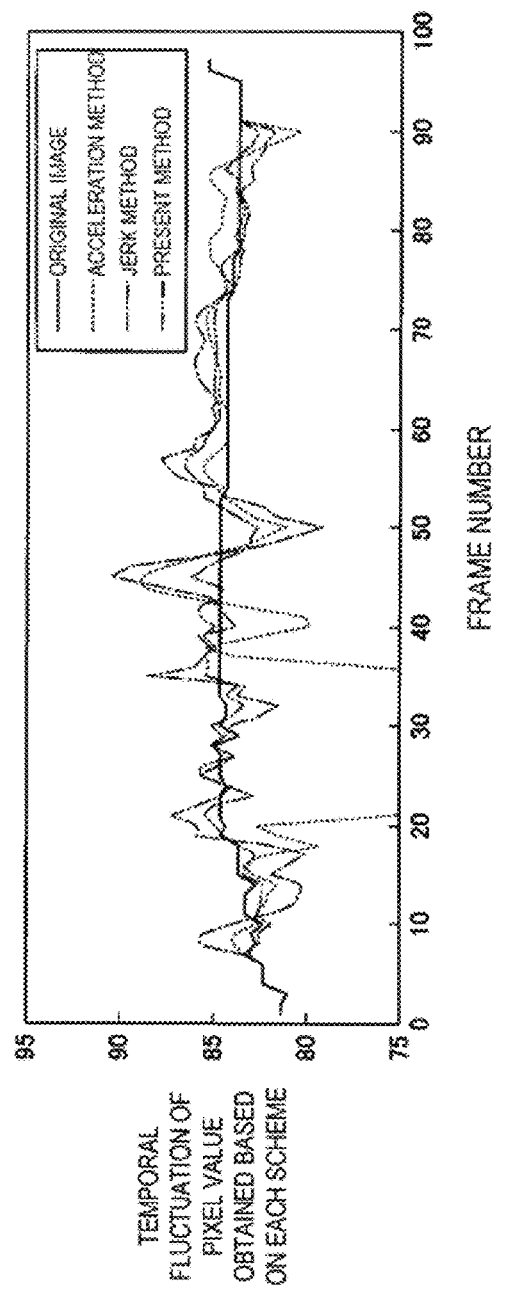
FIG. 9 illustrates an example of a pixel value of a pixel of an original image in which the amount of change in motion change has not been adjusted and a pixel value of a pixel of each image in which the amount of change in motion change has been adjusted in the first embodiment.

FIG. 9 is a diagram illustrating an example of the pixel value of the pixel 321 of the original image in which the amount of change in motion change has not been adjusted and the pixel value of the pixel 321 of each image in which the amount of change in motion change has been adjusted. A horizontal axis indicates a frame number (time). A vertical axis indicates the pixel value.

A difference between the pixel value of the image pixel 321 adjusted based on an acceleration or a jerk and the pixel value of the pixel 321 of the original image is greater than a difference between the pixel value of the pixel 321 of the image adjusted based on the variance value and the pixel value of the pixel 321 of the original image. As described above, in the image adjusted based on the variance value, expansion or attenuation of the random noise is reduced even when the amount of change in subtle phase change is adjusted. Thus, it is possible to reduce the expansion or attenuation of the random noise mixed in the moving image based on the variance value.

As described above, the image processing apparatus 1 of the first embodiment includes the change detection unit 4 and the reliability estimation unit 5. The change detection unit 4 may execute the process that is executed by the decomposition conversion unit 3, instead of the decomposition conversion unit 3. The change detection unit 4 detects a direction change that is a temporal fluctuation in a plausible direction orthogonal to an edge determined for each pixel in an edge image indicating a high frequency component in an image that is an image processing target and a phase change that is a temporal fluctuation of the phase of the high frequency component according to the direction change (a plausible direction). The change detection unit 4 may detect a subtle phase change having a predetermined amount of change. The reliability estimation unit 5 estimates the reliability "maskS'''" indicating that the detected phase change is not a change caused by noise based on the variance value of the direction change per unit time. The reliability estimation unit 5 may estimate the reliability "mask" based on the variance value of the direction change per unit time.

This makes it possible to reduce the adjustment of the random noise mixed in the moving image when the image processing apparatus adjusts the amount of change in subtle motion change of the moving image.

The reliability estimation unit 5 of the first embodiment may estimate the reliability of the detected phase change based on the variance value of the direction change in the pixel showing the detected phase change. The reliability becomes higher when the variance value of the direction change becomes smaller. The reliability estimation unit 5 may estimate the reliability for each pixel based on the phase change in the region including the pixels of the edge image.

Second Embodiment

A second embodiment differs from the first embodiment in that, when the image processing apparatus adjusts an amount of change in subtle change in color or luminance, the image processing apparatus reduces adjustment of random noise mixed in a moving image. Differences between the second embodiment and the first embodiment will be described.

Figure 10:
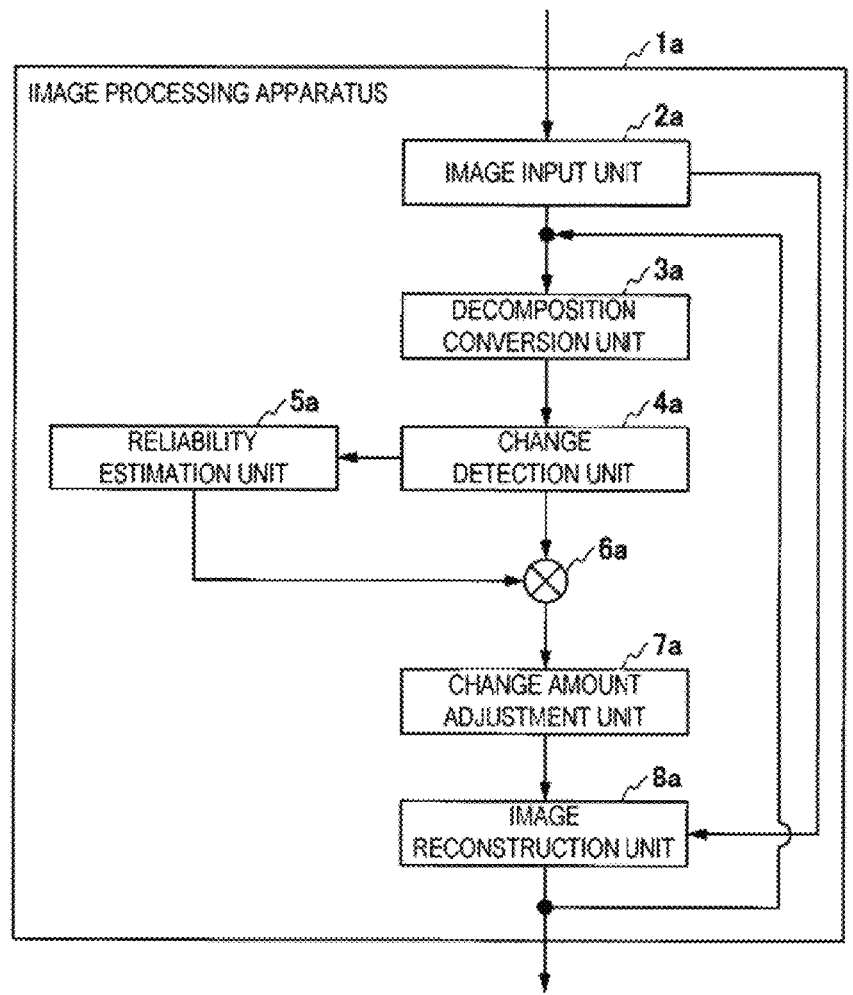
FIG. 10 is a diagram illustrating a configuration example (first combination) of an image processing apparatus according to a second embodiment.

FIG. 10 is a diagram illustrating a configuration example (first combination) of the image processing apparatus 1a. The image processing apparatus 1a is an apparatus that executes a predetermined image processing on a moving image. The predetermined image processing is, for example, image processing of video magnification.

The image processing apparatus 1a includes an image input unit 2a, a decomposition conversion unit 3a, a change detection unit 4a, a reliability estimation unit 5a, a multiplication unit 6a, a change amount adjustment unit 7a, and an image reconstruction unit 8a.

In the second embodiment, the image processing apparatus 1a sequentially executes first image processing and second image processing. That is, the image processing apparatus 1a executes the first image processing on the moving image, and further executes the second image processing on the moving image. An execution order of the first image processing and the second image processing may be reversed.

In the first image processing, each functional unit of the image processing apparatus 1a executes the same processing as each functional unit of the image processing apparatus 1 of the first embodiment. That is, the image processing apparatus 1*a* executes the first image processing on the moving image to emphasize or attenuate a subtle motion change of the subject.

The image processing apparatus 1*a* executes the second image processing on the moving image to emphasize or attenuate a specific subtle color or luminance change of the subject. In the second image processing, the adjustment rate "a" of the phase change is 0. For example, the image processing apparatus 1*a* emphasizes or attenuates a selected pixel value in the moving image to emphasize or attenuate a specific subtle color or luminance change of the subject. Here, the selected pixel value is a pixel value of the color or luminance selected as a processing target in advance, and is, for example, any one of a pixel value of R, a pixel value of G, a pixel value of B, a pixel value of Y, a pixel value of E, and a pixel value of Q. The pixel values of Y, E, and Q are values indicating brightness from RGB.

Next, a process of emphasizing or attenuating a subtle change in color or luminance will be described.

Figure 11:
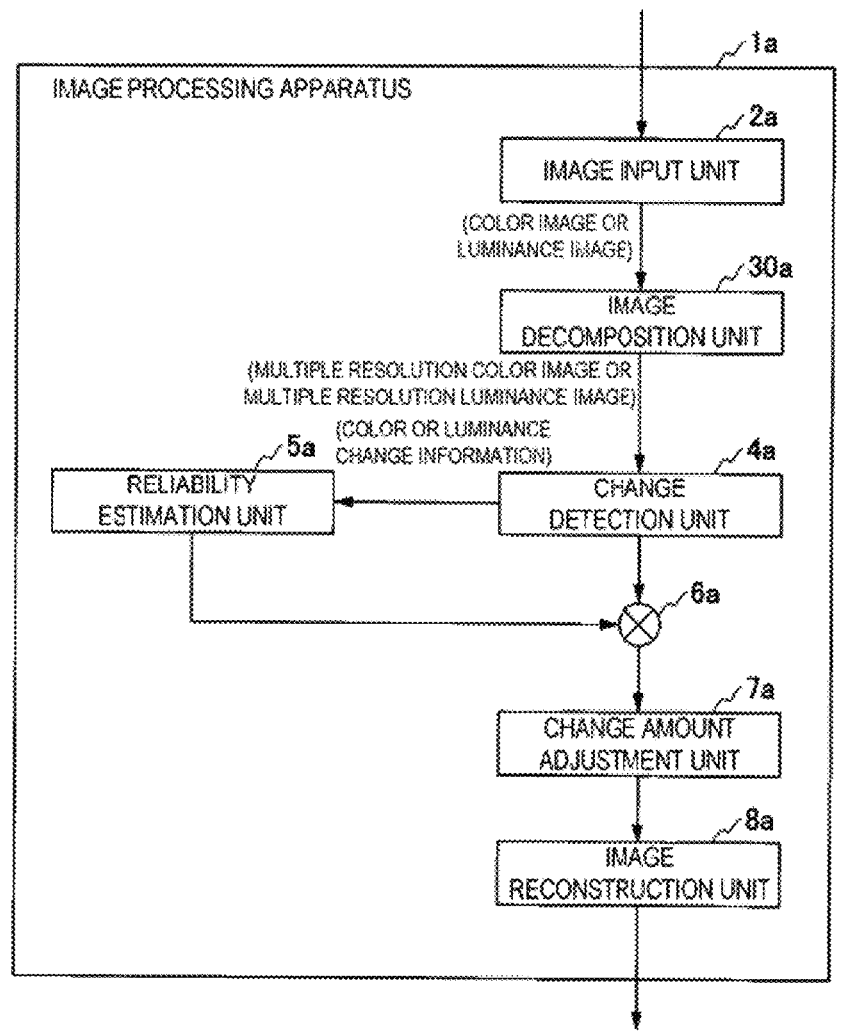
FIG. 11 is a diagram illustrating a configuration example of each functional unit that emphasizes or attenuates a specific subtle color or luminance change of a subject in the second embodiment.

FIG. 11 is a diagram illustrating a configuration example of each functional unit that emphasizes or attenuates a specific subtle color or luminance change of a subject. The decomposition conversion unit 3*a* illustrated in FIG. 10 includes an image decomposition unit 30*a*. The image processing apparatus 1*a* includes an image input unit 2*a*, an image decomposition unit 30*a*, a change detection unit 4*a*, a reliability estimation unit 5*a*, a multiplication unit 6*a*, a change amount adjustment unit 7*a*, and an image reconstruction unit 8*a* as respective functional units that emphasize or attenuate a specific subtle color or luminance change of a subject.

The image input unit 2*a* receives the multiple frames of the moving image that is an image processing target and information on the color or luminance selected as a processing target. Alternatively, the image input unit 2*a* receives a color image or a luminance image after conversion of the frames of the moving image to a predetermined luminance space or color space. The image input unit 2*a* outputs a color image or original resolution luminance image that is an image processing target and the information on the selected color or luminance to the image decomposition unit 30*a*. In the following description, a case in which the original resolution color image is input will be described as an example. When the luminance image is input instead of the color image, processing is also the same as that when the color image is input.

The image decomposition unit 30*a* receives the original resolution color image that is an image processing target and information on the selected color. The image decomposition unit 30*a* decomposes the information on the selected color from among the original resolution color image at time t of the input moving image into mutually different resolutions. Specifically, the image decomposition unit 30*a* repeats a process of convolving the Gaussian filter with respect to the information on the selected color in the input original resolution color image and then performing downsampling a multiple times to decompose the input original resolution color image into a multiple resolutions. Downsampling is a process of reducing the resolution based on the amount of downsampling. The amount of downsampling has a value smaller than 1 (for example, ½). The image decomposition unit 30*a* outputs color images having mutually different resolutions to the change detection unit 4.

Figure 12:
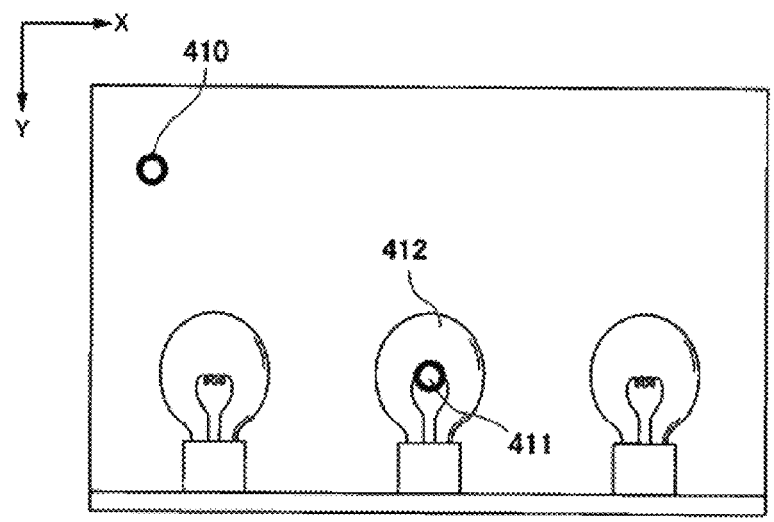
FIG. 12 is a diagram illustrating an example of pixels in a frame of a moving image in the second embodiment.

FIG. 12 is a diagram illustrating an example of pixels in a frame of a moving image. Hereinafter, an x-coordinate in a horizontal direction and a y-coordinate in a vertical direction are determined in the frame of the moving image. In the frame illustrated in FIG. 12, a state in which three light bulbs are lit is imaged. The frame illustrated in FIG. 12 includes a pixel 410, a pixel 411, and a light bulb image 412. The pixel 410 is a pixel included in a background image captured in a third partial region of the frame. The pixel 411 is a pixel included in the light bulb image 412 captured in a fourth partial region of the frame.

Figure 13:
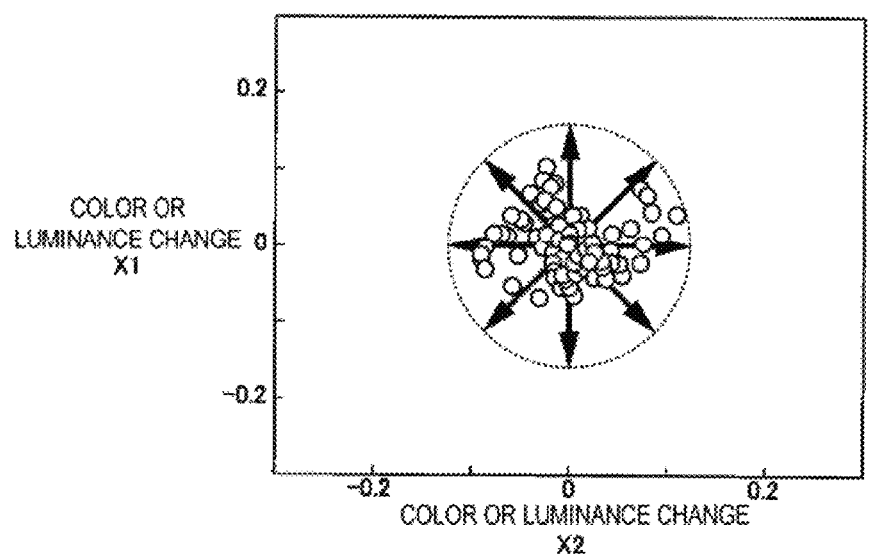
FIG. 13 is a diagram illustrating a first example (isotropic diffusion) of dispersion of the subtle color or luminance change in the second embodiment.

FIG. 13 is a diagram illustrating isotropic diffusion of the subtle color or luminance change. In FIG. 13, a vertical axis indicates change in color or luminance of a certain pixel x1 in a frame, and a horizontal axis indicates change in color or luminance of a certain pixel x2 in the frame. The subtle change in color or luminance illustrated in FIG. 13 is a subtle change in time-series color or luminance in a color image or luminance image. A meaningless change in subtle color or luminance is the isotropic diffusion, as in an example illustrated in FIG. 13.

Figure 14:
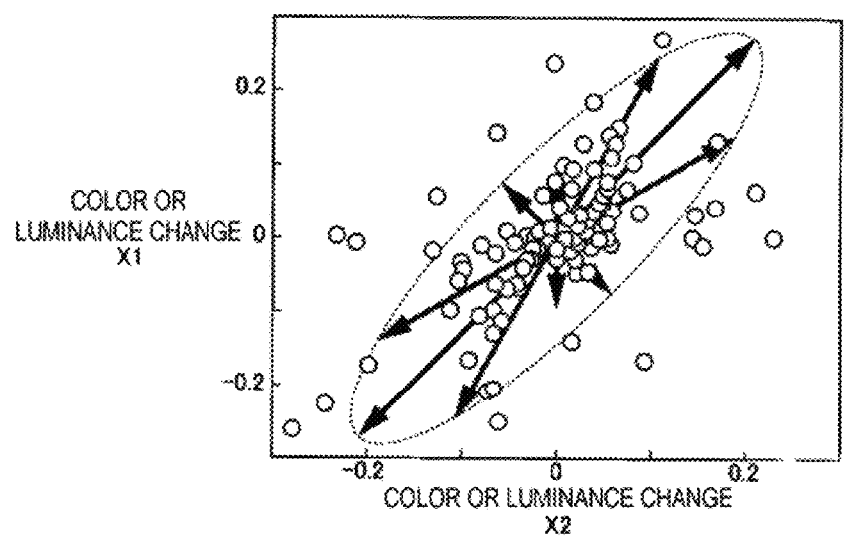
FIG. 14 is a diagram illustrating a second example (anisotropic diffusion) of the dispersion of the subtle color or luminance change in the second embodiment.

FIG. 14 is a diagram illustrating anisotropic diffusion of the subtle color or luminance change. In FIG. 14, a vertical axis indicates change in color or luminance of a certain pixel x1 in a frame, and a horizontal axis indicates change in color or luminance of a certain pixel x2 in the frame. A subtle change in color or luminance illustrated in FIG. 14 is a time-series subtle change in color or luminance in a color image or luminance image. A meaningful subtle change in color or luminance is the anisotropic diffusion. An amount of change in the meaningful subtle color or luminance change changes so that a time distribution is biased in a specific direction.

Referring back to FIG. 11, description of a configuration example of the image processing apparatus 1*a* will be continued. The change detection unit 4*a* receives the color image having each resolution output from the image decomposition unit 30*a*. The change detection unit 4*a* detects subtle change in color in the color image having each resolution based on the input color image having each resolution. The change detection unit 4*a* outputs information indicating the detected subtle change in color or luminance in the color image or luminance image (hereinafter referred to as "color or luminance change information") to the reliability estimation unit 5*a* and the multiplication unit 6*a* for each resolution.

The reliability estimation unit 5*a* receives the color or luminance change information. The reliability estimation unit 5*a* estimates the reliability of the subtle color or luminance change "B″(x, y, t)" based on the received color or luminance change information. The reliability of the subtle color or luminance change is reliability of a subtle color or luminance change that occurs in a pixel value of an image due to a physical phenomenon other than random noise. The reliability estimation unit 5*a* estimates the reliability so that the reliability of the subtle color or luminance change occurring in the pixel value of the image due to the random noise mixed in the image due to, for example, thermal noise of the image sensor is lower than the reliability of the subtle color or luminance change that occurs in the pixel value of the image due to the physical phenomenon other than the random noise. The reliability estimation unit 5*a* outputs the estimated reliability to the multiplication unit 6*a*. The reliability estimation unit 5*a* outputs the estimated reliability to the multiplication unit 6*a*. The reliability estimated by the reliability estimation unit 5*a* becomes higher when a time distribution of the subtle color or luminance change indicates anisotropy. In other words, the reliability becomes higher when a diffusion result indicates anisotropy.

The multiplication unit 6a receives the color or luminance change information and the reliability. The multiplication unit 6a multiplies the received color or luminance change information by the reliability for each pixel, and outputs a result of the multiplication (a multiplication result) to the change amount adjustment unit 7a. The multiplication unit 6a multiplies the color or luminance change information by the reliability so that the subtle color or luminance change "^C"(x, y, t, θ)" occurring in the pixel value of the image due to a physical phenomenon other than random noise is detected with high accuracy.

The change amount adjustment unit 7a receives the multiplication result (color or luminance change multiplied by the reliability) output by the multiplication unit 6a. The change amount adjustment unit 7a executes video magnification for the received multiplication result of the multiplication unit 6a. That is, the change amount adjustment unit 7a adjusts an amount of change in the subtle color or luminance change multiplied by the reliability through emphasis or attenuation. Accordingly, the change amount adjustment unit 7a generates an image (hereinafter referred to as "adjusted image") in which the amount of change in the subtle color or luminance change has been adjusted, for each resolution. The change amount adjustment unit 7a outputs a multiple adjusted images having mutually different resolutions to the image reconstruction unit 8.

The image reconstruction unit 8a (image combination unit) receives the multiple adjusted images having mutually different resolutions. The image reconstruction unit 8a (image combination unit) reconstructs an image based on the received adjusted images. Specifically, the image reconstruction unit 8a adjusts sizes of the multiple adjusted images having mutually different resolutions to the same size, and performs addition to reconstruct an image in which the subtle color or luminance change has been emphasized. When the conversion to the color space or the luminance space has been performed, the image reconstruction unit 8a performs inverse conversion thereof to obtain a final video output. The image reconstruction unit 8a outputs the combination result to a predetermined external device as an image finally adjusted by using the video magnification.

The predetermined external device is, for example, a device that executes image processing other than video magnification, an image recognition device, or a display device. When the predetermined external device is the image recognition device, the image recognition device may use, as a feature for image recognition, the combination result (image finally adjusted by using the video magnification).

Next, the image processing apparatus 1a will be described in detail. The image input unit 2a acquires the multiple frames of the moving image that is an image processing target and information on color or luminance selected as a processing target. The image input unit 2a outputs a color image or original resolution luminance image that is an image processing target and the information on the selected color or luminance to the image decomposition unit 30a.

The image decomposition unit 30a decomposes the color image of the information on the selected color from among the color images having original resolution in time t of the input moving image into mutually different resolutions. The image decomposition unit 30a outputs color images having mutually different resolutions to the change detection unit 4a.

The change detection unit 4a detects subtle change in color in the color image having each resolution. When a luminance image having each resolution is input, the change detection unit 4a detects a subtle change in the luminance in the luminance image having each resolution. The change detection unit 4a convolves the temporal filter "H(t)" having a frequency response with a subtle change to be emphasized with respect to the color or luminance change "I"(x, y, t))" in the video having each resolution obtained in the image decomposition unit 30a or multiplies the color or luminance change by the spatiotemporal filter "J(x, y, t)" for removing large change to detect the subtle color or luminance change "B"(x, y, t)" as in Equation (21) below. The change detection unit 4a may not multiply the color or luminance change by the spatiotemporal filter "J(x, y, t)". That is, when the change detection unit 4a detects the subtle color or luminance change "B"(x, y, t)", the change detection unit 4a may not use the spatiotemporal filter "J(x, y, t).

[Equation 21]

$$B''(x,y,t)=J(x,y,t)\circ(H(t)\otimes I''(x,y,t)) \quad (21)$$

In Equation (21), among operators, an operator including a mark "x" in a mark "○" indicates a convolution operator, and an operator "○" indicates a multiplication (element-wise product). H(t) indicates a band-pass filter, and "J(x, y, t)" is a jerk filter for the purpose of removing only abrupt change, which is a representative example. A filter that is used by the change detection unit 4a is not limited thereto.

The subtle color or luminance change "B"(x, y, t)" obtained by the change detection unit 4a includes a "meaningful" subtle color or luminance change caused by a natural phenomenon or a physical phenomenon and a "meaningless" subtle color or luminance change derived from noise mixed in an imaging process like the random noise mixed in the image due to, for example, thermal noise of the image sensor shared as in Equation (22) below. The noise mixed in the imaging process is, for example, thermal noise, camera shake, ground vibration, or the like.

[Equation 22]

$$B''(x,y,t)=\hat{B}''(x,y,t)+\tilde{B}''(x,y,t) \quad (22)$$

In Equation (22). "^B"(x, y, t)" indicates a "meaningful" subtle color or luminance change, and "~B"(x, y, t)" indicates a "meaningless" subtle color or luminance change.

The reliability estimation unit 5a uses the subtle color or luminance change "B"(x, y, t)" obtained by a change detection unit a4 to estimate the reliability of the subtle color or luminance change "B"(x, y, t)". Specifically, the reliability estimation unit 5a evaluates a temporal behavior (time distribution) of the subtle color or luminance change "B"(x, y, t)" obtained by the change detection unit 4 to estimates the reliability of the subtle color or luminance change. Considering a video region $(-)X \in R^{(h \times x)} = R^d$ around a certain place (x, y) and a time width "(-)t" around a certain time t with respect to the subtle color or luminance change "B"(x, y, t)" output from the change detection unit 4a, a diffusion equation regarding the subtle color or luminance change "B"((-)x, (-)t)" can be formulated as in Equation (23) below.

[Equation 23]

$$f(B^n(\bar{x}, \bar{t})) = \frac{1}{(2\pi)^{d/2}|D|^{1/2}}\exp\left(-\frac{1}{2}B^n(\bar{x})^T D^{-1} B^n(\bar{x})\right) \quad (23)$$

In Equation (23), "f(B″((−)x, (−)t))" indicates the time distribution of the subtle color or luminance change, and "D" indicates a diffusion tensor matrix in the time width "(−)t". From Equation (23) above, the diffusion tensor matrix can be obtained as in Equation (24) below.

[Equation 24]

$$D = \text{cov}(B''(\overline{x},\overline{t})) \quad (24)$$

In Equation (24), "cov(X)" means that a variance-covariance matrix of an X matrix is calculated. Thereafter, the reliability estimation unit 5a performs eigen decomposition on "D" to obtain a fractional anisotropy (hereinafter referred to as "FA"), which is a feature quantity regarding the time distribution of the subtle color or luminance change, from Equation (25) below.

[Equation 25]

$$FA^n(x, y, t) := \sqrt{\frac{d}{d-1}} \cdot \frac{\sqrt{\sum_{i=1}^{n}(\lambda_i - \overline{\lambda})^2}}{\sqrt{\sum_{i=1}^{n}\lambda_i^2}} \quad (25)$$

In Equation (5), $(\lambda_1, \ldots, \lambda_d)$ is an eigenvalue of "D", "(−)λ" is an average thereof, and "d" indicates the number of pixels that are processing targets. Here, the number "d" of pixels that are processing targets is the number of pixels to be adjusted. "FA" is a feature quantity having "1" when the time distribution indicates anisotropy and "0" when the time distribution indicates isotropy. The "meaningful" subtle color or luminance change caused by a natural or physical phenomenon has a biased time distribution in a specific direction and has high anisotropy. Thus, the "meaningful" subtle color or luminance change indicates a FA value close to "1". On the other hand, the "meaningless" subtle color or luminance change derived from noise mixed in during the imaging process has a time distribution diffused in random directions, has low anisotropy, and has high isotropy. Thus, the "meaningless" subtle color or luminance change has an FA value close to "0". Thus, the reliability estimation unit 5a estimates the reliability of the subtle color or luminance change based on Equation (26) below using the FA.

[Equation 26]

$$FAF_{\sigma,\gamma}''(x,y,t) = (\text{Norm}(G_\sigma \otimes FA^n(x,y,t)))^\gamma \quad (26)$$

In Equation (26), "$FAF_{\sigma,\gamma}''(x, y, t)$" is the spatiotemporal filter indicating the reliability of the subtle color or luminance change, "$G_\sigma$" is a function for spatially smoothing "$FAF_{\sigma,\gamma}''(x, y, t)$", and the parameter "σ" is a parameter indicating the strength of smoothing. Here, "Norm (X)" indicates that a value of the argument "X" is normalized to a range from 0 to 1. A method of spatial smoothing of the parameter "$G_\sigma$" and a method of normalization are not limited to specific methods. The reliability "$FAF_{\sigma,\gamma}''(x, y, t)$" indicates reliability of the subtle color or luminance change in a region including the coordinates (x, y) in a range 0 to 1. The reliability of the subtle color or luminance change become higher when the value becomes greater.

The multiplication unit 6a multiplies the color or luminance change information and the reliability estimated by the reliability estimation unit 5a for each pixel. More specifically, the multiplication unit 6a multiplies the reliability "$FAF_{\sigma,\gamma}''(x, y, t)$" shown in Equation (26) by "B″(x, y, t)" shown in Equation (21), as in Equation (27) below.

[Equation 27]

$$\hat{B}''(x,y,t) = FAF_{\sigma,\gamma}''(x,y,t) \circ B''(x,y,t) \quad (27)$$

According to Equation (27), the subtle color or luminance change "^B″(x, y, t)" that occurs in the pixel value of the image due to the physical phenomenon other than the random noise are detected with high accuracy.

The change amount adjustment unit 7a multiplies the subtle color or luminance change "^B″(x, y, t)" obtained using Equation (27) by the adjustment rate (emphasis rate) "a" of the color or luminance. That is, the change amount adjustment unit 7a multiplies the subtle color or luminance change "^B″(x, y, t)" derived with high accuracy as in Equation (27) by the adjustment rate (emphasis rate) "α" of the color or the luminance as in Equation (28) below. The change amount adjustment unit 7a adds the change "I″(x, y, t)" in color or luminance of a change source of the original color or luminance to the multiplication result to derive the change "^I″(x, y, t)" in color or luminance of which the amount of change in gentle and subtle change in color or luminance has been adjusted (for example, emphasized or attenuated), as in Equation (28).

[Equation 28]

$$\hat{I}''(x,y,t) = I''(x,y,t) + \alpha \cdot \hat{B}''(x,y,t) \quad (28)$$

Thus, the change amount adjustment unit 7a adjusts an amount of change in the detected subtle change in color or luminance. The adjustment rate may be the same or different for each resolution, direction, time, or position.

When the subtle color or luminance is emphasized, the predetermined adjustment rate "α" is set to a positive value greater than 0. When the subtle color or luminance is attenuated, the predetermined adjustment rate "α" is set to a negative value smaller than 0. An upper limit value and a lower limit value of "α" may not be specifically determined. However, for example, when the subtle color or luminance is attenuated, a value of the predetermined adjustment rate "α" in a case in which a value of an original subtle color or luminance change "I″(x, y, t)" becomes 0 is set as the lower limit of "α". When "α" is set to 0, the subtle color or luminance change is not adjusted.

The image reconstruction unit 8a (image combination unit) reconstructs the image. The image reconstruction unit 8a obtains Equation (28) for each resolution, and performs addition in the resolution direction while performing upsampling to perform conversion to color or luminance information in which only "meaningful" subtle color or luminance change has been emphasized and reconstruct image having original resolution. When conversion to a color space or a luminance space has been performed, the image reconstruction unit 8a can perform inverse conversion thereof to obtain a final video output.

The image reconstruction unit 8a combines the image having original resolution in which the color or luminance change has been emphasized with the reconstructed original resolution luminance image. For example, the image reconstruction unit 8a generates an average image of the image having original resolution in which the color or luminance change has been emphasized and the reconstructed original resolution luminance image.

Figure 15:
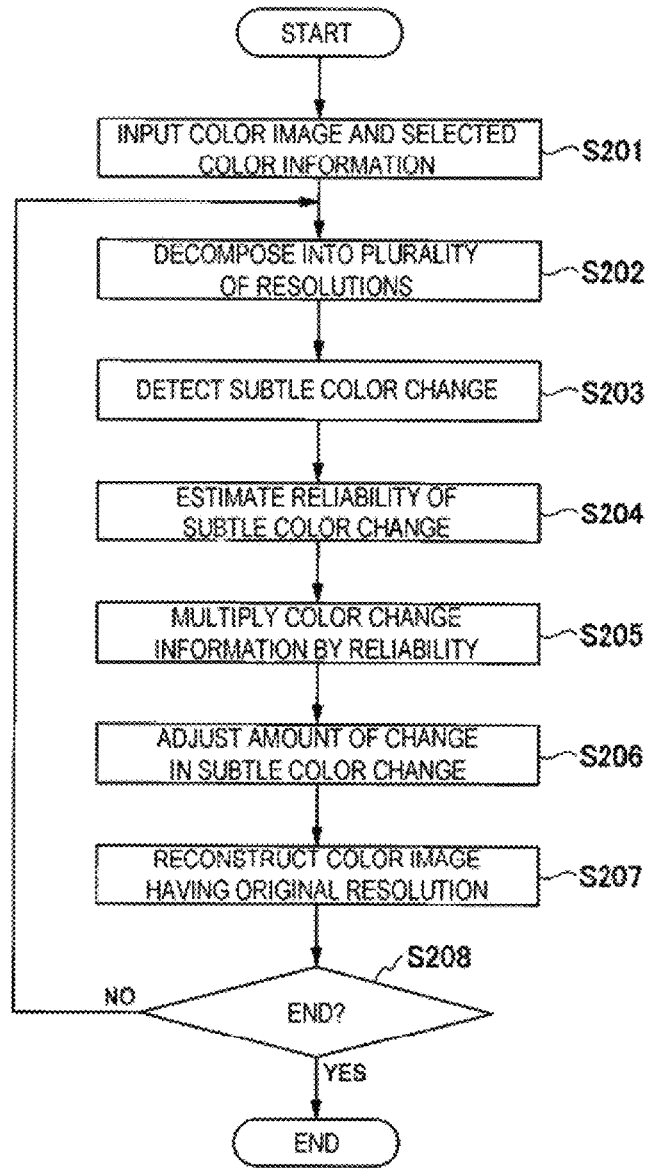
FIG. 15 is a flowchart illustrating an operation example of the image processing apparatus according to the second embodiment.

Next, an operation example of the image processing apparatus 1a will be described. FIG. 15 is a flowchart illustrating the operation example of the image processing apparatus 1a. In FIG. 15, a case in which the original resolution color image that is an image processing target and information on the selected color are input to the image input unit 2a will be described as an example. When the original resolution luminance image that is an image processing target and the information on the selected luminance are input to the image input unit 2a, it is only required that the original resolution color image is read as the original resolution luminance image and the color information is read as the luminance information in the processing of FIG. 15.

The image input unit 2a receives the original resolution color image that is an image processing target and the information on the selected color (step S201). The image input unit 2a outputs the original resolution color image and the information on the selected color to the image decomposition unit 30a. The decomposition conversion unit 3 decomposes the color image having the information on the selected color from among the color images having original resolution in time t of the input moving image into mutually different resolutions (step S202). The image decomposition unit 30a outputs the color image having each resolution to the change detection unit 4a.

The change detection unit 4a detects the subtle change in color in the color image having each resolution based on the color image output from the image decomposition unit 30a (step S203). The change detection unit 4a outputs the detected subtle change in the color of each resolution as color or luminance change information to the reliability estimation unit 5a and the multiplication unit 6a.

The reliability estimation unit 5a estimates the reliability "$FAF_{o,\gamma}''(x, y, t)$" of the subtle color or luminance change "$B''(x, y, t)$" based on the color or luminance change information output from the change detection unit 4 (step S204). The reliability estimation unit 5a outputs the estimated reliability "$FAF_{o,\gamma}''(x, y, t)$" to the multiplication unit 6a.

The multiplication unit 6a multiplies the color or luminance change information output from the change detection unit 4a with the reliability "$FAF_{o,\gamma}''(x, y, t)$" output from the reliability estimation unit 5a (step S205). The multiplication unit 6a outputs a multiplication result to the change amount adjustment unit 7. The change amount adjustment unit 7a adjusts the amount of change in the subtle color or luminance change multiplied by the reliability through emphasis or attenuation using the multiplication result output from the multiplication unit 6a (step S206). The change amount adjustment unit 7a outputs information on the amount of change in the subtle change in color or luminance to the image reconstruction unit 8a. The image reconstruction unit 8 reconstructs the original resolution color image based on a multiple adjusted images having mutually different resolutions (step S207).

The image decomposition unit 30a determines whether the image processing apparatus 1a ends the processing based on, for example, an instruction obtained from the user (step S208). When the image processing apparatus 1a continues the processing (step S208: NO), each functional unit of the image processing apparatus 1a returns the processing to step S202. When the image processing apparatus 1a ends the processing (step S208: YES), each functional unit of the image processing apparatus 1a ends the processing.

As described above, the image processing apparatus 1a of the second embodiment includes a change detection unit 4a and a reliability estimation unit 5a. The change detection unit 4a detects a predetermined color or luminance change from among color or luminance changes in the color or luminance image having a multiple resolutions. The reliability estimation unit 5a estimates the reliability "$FAF_{o,\gamma}''(x, y, t)$" of the detected color or luminance change based on time-series color or luminance change in the color or luminance image.

Accordingly, the image processing apparatus 1a can more accurately detect the "meaningful" subtle change in color or luminance among the subtle changes in the detected video. Thus, the image processing apparatus 1a can adjust the amount of change in "meaningful" subtle color or luminance change. Thus, the image processing apparatus 1a can reduce the adjustment of the random noise mixed in the moving image when adjusting the amount of change in subtle color or the luminance change of the moving image.

Third Embodiment

A third embodiment differs from the second embodiment in that a process of adjusting the amount of change in phase change (motion change) by the image processing apparatus and a process of adjusting the amount of change in subtle change in the color or luminance by the image processing apparatus are executed in parallel. Differences between the third embodiment and the second embodiment will be described.

Figure 16:
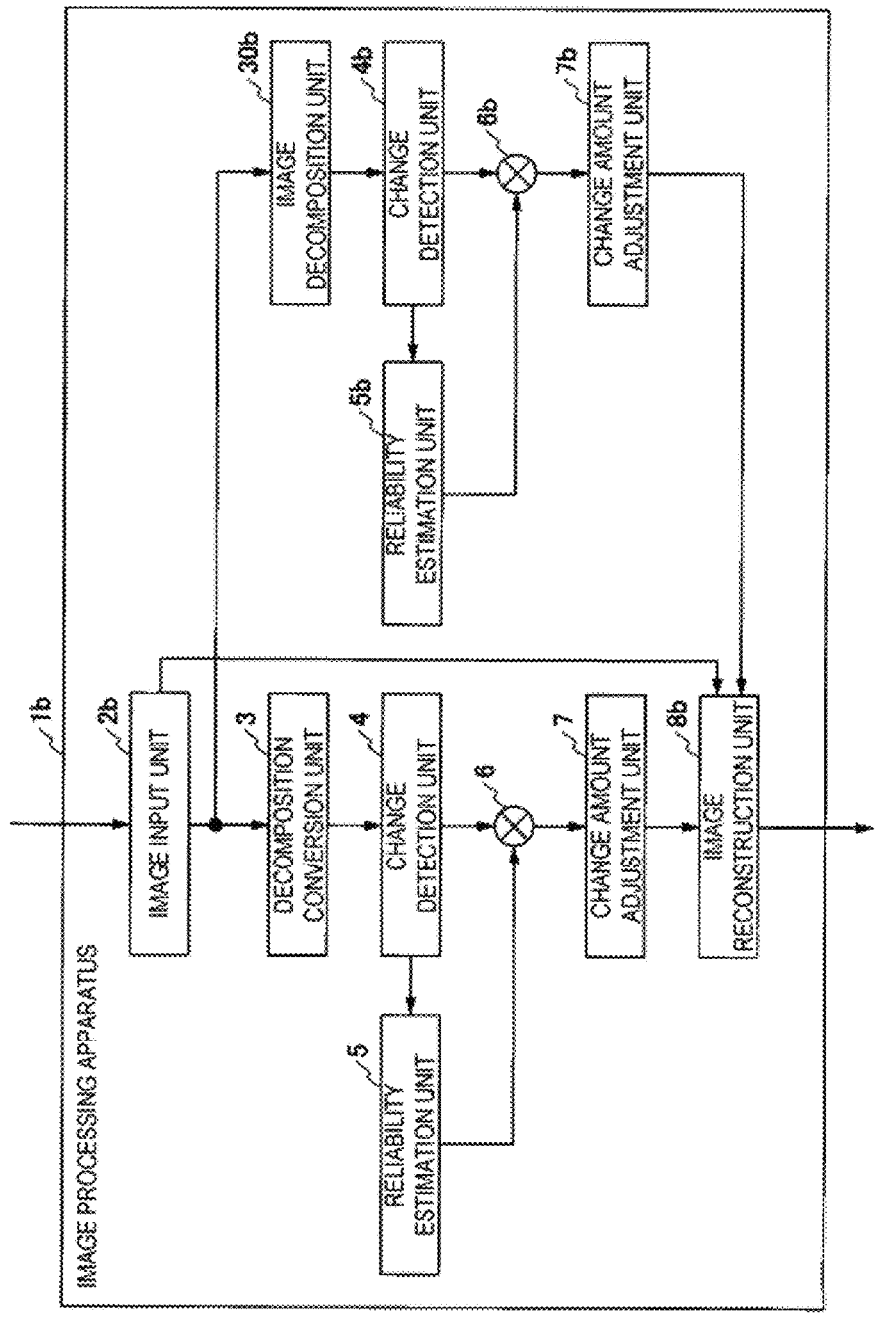
FIG. 16 is a diagram illustrating a configuration example (second combination) of an image processing apparatus according to a third embodiment.

FIG. 16 is a diagram illustrating a configuration example (second combination) of the image processing apparatus 1b. The image processing apparatus 1b is an apparatus that executes a predetermined image processing on a moving image. The predetermined image processing is, for example, image processing of video magnification.

The image processing apparatus 1b includes an image input unit 2b, a decomposition conversion unit 3, a change detection unit 4, a reliability estimation unit 5, a multiplication unit 6, a change amount adjustment unit 7, and an image reconstruction unit 8b. The image processing apparatus 1b further includes an image decomposition unit 30b, a change detection unit 4b, a reliability estimation unit 5b, a multiplication unit 6b, and a change amount adjustment unit 7b.

In the third embodiment, the image processing apparatus 1b executes the first image processing and the second image processing in parallel. The image processing apparatus 1b executes the first image processing for the moving image to emphasize or attenuate subtle motion change of the subject. In the first image processing, the image input unit 2b, the decomposition conversion unit 3, the change detection unit 4, the reliability estimation unit 5, the multiplication unit 6, the change amount adjustment unit 7, and the image reconstruction unit 8b execute the same processing as that of the respective functional units of the image processing apparatus 1 in the first embodiment.

The image processing apparatus 1b executes the second image processing for the moving image to emphasize or attenuate a specific subtle color or luminance change of the subject. In the second image processing, the image input unit 2b, the image decomposition unit 30b, the change detection unit 4b, the reliability estimation unit 5b, the multiplication unit 6b, the change amount adjustment unit 7b, and the image reconstruction unit 8b executes the same processing as that of the image input unit 2a, the image decomposition unit 30a, the change detection unit 4a, the reliability estimation unit 5a, the multiplication unit 6a, the change amount adjustment unit 7a, and the image reconstruction unit 8a in the second embodiment.

The image reconstruction unit 8b acquires, from the change amount adjustment unit 7, a multiple adjusted edge images having mutually different resolutions. The image reconstruction unit 8 combines the multiple adjusted edge images having mutually different resolutions to reconstruct the original resolution luminance image. The image reconstruction unit 8b may acquire the original resolution color image from the image input unit 2. The image reconstruction unit 8b may combine the reconstructed original resolution luminance image and the original resolution color image.

The image reconstruction unit 8b acquires the image having the original resolution in which the color or luminance change has been emphasized from the change amount adjustment unit 7b. The image reconstruction unit 8b combines the image having original resolution in which the color or luminance change has been emphasized with the reconstructed original resolution luminance image. For example, the image reconstruction unit 8b generates an average image of the image having original resolution in which the color or luminance change has been emphasized and the reconstructed original resolution luminance image.

The image processing apparatus 1b of the third embodiment may sequentially execute the first image processing and the second image processing, as in the second embodiment. That is, the image processing apparatus 1b may execute the first image processing on the moving image and further execute the second image processing on the moving image. An execution order of the first image processing and the second image processing may be reversed.

As described above, the image processing apparatus 1b of the third embodiment includes a change detection unit 4b and a reliability estimation unit 5b. The change detection unit 4b detects a predetermined color or luminance change among the color or luminance changes in the color or luminance image having a multiple resolutions. The reliability estimation unit 5b estimates the reliability "$FAF_{o,\gamma}''(x, y, t)$" of the detected color or luminance change based on the time-series color or luminance change in the color or luminance image.

This makes it possible for the image processing apparatus 1b to more accurately detect "meaningful" subtle change in color or luminance among subtle changes in the detected video. Thus, the image processing apparatus 1b can adjust the amount of change in "meaningful" subtle color or luminance change. Thus, the image processing apparatus 1b can reduce adjustment of random noise mixed in the moving image when adjusting the amount of change in subtle color or the luminance change of the moving image.

Fourth Embodiment

A fourth embodiment differs from the first to third embodiments in that the image processing apparatus executes the processing of adjusting the amount of change in phase change for a partial region of the edge image. In the fourth embodiment, differences from the first to third embodiments will be described.

Figure 17:
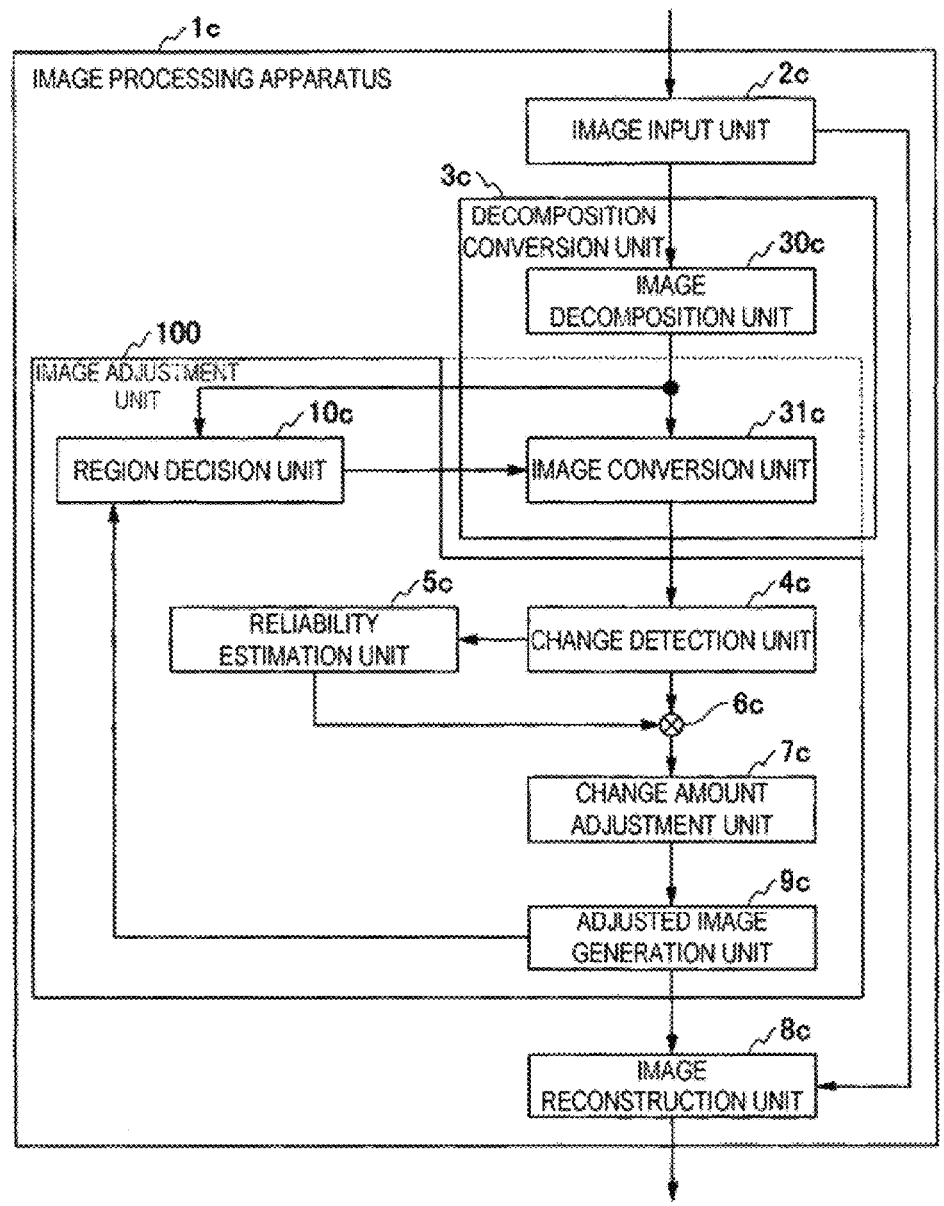
FIG. 17 is a diagram illustrating a configuration example (first combination) of an image processing apparatus according to a fourth embodiment.

FIG. 17 is a diagram illustrating a configuration example of an image processing apparatus 1c. The image processing apparatus 1c is an apparatus that executes a predetermined image processing on a moving image. The predetermined image processing is, for example, processing of video magnification.

The image processing apparatus 1c includes an image input unit 2c, a decomposition conversion unit 3c, an image adjustment unit 100, and an image reconstruction unit 8c. The decomposition conversion unit 3c includes an image decomposition unit 30c and an image conversion unit 31c. The image adjustment unit 100 may include the decomposition conversion unit 3c instead of the decomposition conversion unit 3c including the image conversion unit 31c. These functional units may be provided as a single unit, for example a control unit.

The image input unit 2c acquires a multiple frames of the moving image as the image processing target. The image input unit 2c generates the luminance images and the color images from the multiple frames of the moving image. The image input unit 2c outputs an original resolution luminance image to the image decomposition unit 30c. The image input unit 2c outputs an original resolution color image to the image reconstruction unit 8c.

The image decomposition unit 30c generates edge images having mutually different resolutions. For example, the image decomposition unit 30c (hereinafter, referred to as difference image generation unit) generates, as the edge images having mutually different resolutions, images based on differences between luminance images having a predetermined resolution among mutually different resolutions (multi-resolution difference images). The image decomposition unit 30c acquires the original resolution luminance image from the image input unit 2c. The image decomposition unit 30c generates, from the original resolution luminance image, luminance images having mutually different resolutions (multi-resolution luminance images). The image decomposition unit 30c generates a multi-resolution difference image. The image decomposition unit 30c outputs the multi-resolution difference image (difference image in a resolution direction) for each resolution to the image adjustment unit 100.

The image adjustment unit 100 adjusts the amount of change in a subtle motion change of the moving image as the image processing target by emphasis or attenuation. The image adjustment unit 100 acquires the multi-resolution difference images from the image decomposition unit 30c. The image adjustment unit 100 executes the video magnification on the multi-resolution difference images. The image adjustment unit 100 generates difference images between luminance images adjusted by emphasizing or attenuating the amount of change in the subtle motion change in the frames of the moving image (hereinafter, referred to as "adjusted difference images") by executing the video magnification. The image adjustment unit 100 outputs a multiple adjusted difference images having mutually different resolutions to the image reconstruction unit 8c.

The image adjustment unit 100 includes a change detection unit 4c, a reliability estimation unit 5c, a multiplication unit 6c, a change amount adjustment unit 7c, an adjusted image generation unit 9c, and a region decision unit 10c. The image adjustment unit 100 may include an image conversion unit 31c.

The image reconstruction unit 8c (image combination unit) reconstructs the image. The image reconstruction unit 8c acquires, from the image adjustment unit 100, the multiple adjusted difference images having mutually different resolutions. The image reconstruction unit 8c reconstructs the original resolution luminance image based on the multiple adjusted difference images having mutually different resolutions. The image reconstruction unit 8c acquires the original resolution color image front the image input unit 2c. The image reconstruction unit 8c combines the reconstructed original resolution luminance image and the original resolution color image. The image reconstruction unit 8c outputs the combination result to a predetermined external device as an image finally adjusted by using the video magnification.

Next, the image processing apparatus 1c will be described in detail. The image input unit 2c acquires a multiple frames of the moving image as the image processing target. The image input unit 2c generates, an original resolution luminance image "I(x, y, t)" and an original resolution color image from the multiple acquired frames. "x" represents an x-coordinate in the frame of the moving image (such as the luminance image or the like). "y" represents a y-coordinate in the frame of the moving image (such as the luminance image). "t" represents a time of a frame of a time-series moving image. The image input unit 2c outputs the original resolution luminance image "I(x, y, t)" to the image decomposition unit 30c. The image input unit 2c outputs an original resolution color image to the image reconstruction unit 8c.

The image decomposition unit 30c acquires the luminance images of the multiple frames of the moving image from the image input unit 2c. The image decomposition unit 30c uses the original resolution luminance image "I(x, y, t)" as a luminance image "$I^0$(x, y, t)" having a 0th highest resolution (highest resolution) as represented in Equation (1).

The image decomposition unit 30c executes processing of dividing a spatial frequency band (band division processing) on luminance images having a multiple resolutions. That is, the image decomposition unit 30c executes edge detection processing on the luminance images having the multiple resolutions. Accordingly, the image decomposition unit 30c generates edge images (band-divided images) of the luminance images having the multiple resolutions. The method for generating the edge images is not limited to a particular method. For example, the image decomposition unit 30c generates the edge images by using a band-division filter (edge filter) such as a differential filter or a high-pass filter for the luminance images. For example, the image decomposition unit 30c may generate the edge images by executing wavelet transform (octave division) on the luminance images. Hereinafter, the image decomposition unit 30c generates difference images as an example of the edge images. The image decomposition unit 30c generates a difference image "$L^n$(x, y, t)" by using downsampling and a Gaussian filter as follows.

The image decomposition unit 30c executes downsampling on a luminance image "$I^{n-1}$(x, y, t)" having a (n−1)-th predetermined resolution. The number of levels of resolutions is three or more, for example, eight. When the number of levels of resolution is defined as eight levels, the image decomposition unit 30c executes downsampling on the original resolution luminance image seven times.

The image decomposition unit 30c convolutes a Gaussian filter "$G_\sigma$(x, y)" with the downsampling result. The number of levels of the resolution of the luminance image is defined according to a filter size of the Gaussian filter. That is, a minimum size of a block defined in the luminance image is defined according to the filter size of the Gaussian filter. The image decomposition unit 30c generates multi-resolution luminance images ("$I^0$(x, y, t)" . . . . , "$I^n$(x, y, t)") by repeating a computation represented in Equation (2) on the luminance images having the first to n-th highest resolutions.

The right side of Equation (2) represents a convolutional computation of "$G_\sigma$(x, y)" and "downsample ($I^{n-1}$(x, y, z))". The image decomposition unit 30c may execute predetermined interpolation processing on the luminance images on which reduction processing is executed. "$G_\sigma$(x, y)" represents a two-dimensional Gaussian filter having a variance "$\sigma^2$". "downsample (Z)" represents processing of reducing an image having a resolution "Z" based on the amount of downsample (downsampling). The amount of downsample is a fraction, for example, ½. Hereinafter, "n" is an integer of 0 or more and N or less. N is a predetermined integer of 2 or more.

The image decomposition unit 30c executes upsampling on the luminance image "$I^{n+1}$(x, y, t)" having an (n+1)-th highest resolution. Accordingly, the image decomposition unit 30c aligns the resolution of the luminance image "$I^{n+1}$(x, y, t)" having the (n+1)-th highest resolution with the n-th predetermined resolution. That is, the image decomposition unit 30c uses the luminance image "$I^{n+1}$(x, y, t)" having the (n+1)-th highest resolution as the luminance image "upsample ($I^{n+1}$(x, y, t))" having the (n (=n+1−1))-th highest resolution. "upsample (X)" represents processing of enlarging an image having a resolution "X" (upsampling).

The difference image "$L^n$(x, y, t)" (difference image in the resolution direction) between the luminance image "$I^n$(x, y, t)" having the n-th highest resolution and the luminance image "upsample ($I^{n+1}$(x, y, t))" having the n-th highest resolution represented in Equation (2) is represented as in Equation (3).

Each functional unit of the image adjustment unit 100 executes predetermined image processing on the difference image "$L^n$(x, y, t)" having the n-th (0≤n<N) resolution.

The image conversion unit 31c acquires the difference image "$L^n$(x, y, t)" having the n-th highest resolution from the image decomposition unit 30c. The image conversion unit 31c acquires information (region information) on a subregion (X, Y) of the difference image having the n-th highest resolution from the region decision unit 10c. The difference image is used as a processing target in order from a low resolution to a high resolution, and thus, an initial value of the information (region information) on the subregion (X. Y) is required in "n=N (n>0)". The clues of the subregion are not given to the image conversion unit 31c, and thus, the initial value of the information on the subregion (X, Y) of the difference image having the "n=N (n>0)"-th highest resolution is a value representing the entire region (x, y) of the difference image. The image conversion unit 31c converts a luminance change in the processing region (X, Y) included in the difference image "$L^n$(x, y, t)" into a phase change and an amplitude change of the luminance information in a particular spatial direction.

For example, the image conversion unit 31c detects the phase change in a time direction in the difference image in order from a low (coarse) resolution to a high (fine) resolution. That is, the image conversion unit 31c executes processing of detecting the phase change in the time direction in the difference image having the low resolution earlier than processing of detecting the phase change in the difference image having the high resolution.

The method for converting, by the image conversion unit 31c, the luminance change into the phase change and the amplitude change is not limited to a particular method. Hereinafter, the image conversion unit 31c converts the luminance change into the phase change and the amplitude change by, for example, Ricsz transform.

The image conversion unit 31c executes, for example. Fourier transform "fft" and inverse Fourier transform "ifft" on a region "$L^n$(X, Y, t)" included in the difference image "$L^n$(x, y, t)" having the n-th highest resolution. That is, the image conversion unit 31c executes the Riesz transform on the region "$L^n$(X, Y, t)" in Equation (29) to Equation (34).

[Equation 29]

$$F(\omega_x, \omega_y) = fft(L^n(X, Y, t)) \quad (29)$$

[Equation 30]

$$R_1 = ifft\left(F(\omega_X, \omega_Y) * -i\frac{\omega_X}{|\omega|}\right) \quad (30)$$

[Equation 31]

$$R_2 = ifft\left(F(\omega_X, \omega_Y) * -i\frac{\omega_Y}{|\omega|}\right) \quad (31)$$

In Equations (29) to (31), relational equations from Equations (32) to (34) are established.

[Equation 32]

$$L^n(X,Y,t) = A^n(X,Y,t) \cdot \cos(\phi^n(X,Y,t)) \quad (32)$$

[Equation 33]

$$R_1 = A(X,Y,t) \cdot \sin(\phi^n(X,Y,t)) \cos(\theta^n(X,Y,t)) \quad (33)$$

[Equation 34]

$$R_2 = A(X,Y,t) \cdot \sin(\phi^n(X,Y,t)) \sin(\theta^n n(X,Y,t)) \quad (34)$$

Here, "Φ$^n$(X, Y, t)" indicates the phase change occurring according to the direction change "θ$^n$(x, y, t)" in the partial region (X, Y) of the difference image "L$^n$(x, y, t)" having n-th resolution. "θ$^n$(X, Y, t)" represents a direction change in which the phase change occurs. "A$^n$(X, Y, t)" represents an amplitude change. The phase change "Φ$^n$(X, Y, t)" in the subregion (X, Y) of the difference image "L$^n$(x, y, t)" having the n-th highest resolution is represented as in Equation (35).

[Equation 35]

$$\phi^n(X, Y, t) = \tan^{-1}\left(\frac{\sqrt{R_1^2 + R_2^2}}{L^n(X, Y, t)}\right) \quad (35)$$

The image conversion unit 31c outputs information on the phase change "Φ$^n$(X, Y, t)" in the subregion (X, Y) of the difference image "L$^n$(x, y, t)" having the n-th highest resolution to the change detection unit 4c.

The change detection unit 4c acquires the information on the phase change "Φ$^n$(X, Y, t)" in the subregion (X, Y) of the difference image "L$^n$(x, y, t)" having the n-th highest resolution from the image conversion unit 31c. The change detection unit 4c convolutes a temporal filter "H(t)" with the phase change "Φ$^n$(X, Y, t)". Thus, the change detection unit 4c detects a subtle change in the phase change "Φ$^n$(X, Y, t)". The temporal filter "H(t)" is not limited to a particular filter as long as a temporal filter having a frequency response to the phase change (for example, subtle phase change) having a predetermined amount of change as an adjustment target (an emphasis or attenuation target) is used. The temporal filter "H(t)" is, for example, a band-pass filter (see Non Patent Document 1).

The change detection unit 4c multiplies a phase change having a predetermined amount of change (for example, subtle phase change) by a spatiotemporal filter "J(x, y, t)". Accordingly, the change detection unit 4c may remove a sharp phase change (non-gentle phase change) for a time and a space in the difference image "L$^n$(x, y, t)" having the n-th highest resolution.

The spatiotemporal filter "J(X, Y, t)" is not limited to a particular filter as long as a spatiotemporal filter that removes the sharp phase change is used. The spatiotemporal filter "J(X, Y, t)" is, for example, a jerk filter (see Non Patent Document 2). For example, the change detection unit 4c detects and normalizes a non-subtle and sharp change by performing third-order differential on the subtle change. The detection and normalization result is 0 when the subtle change appears, and is 1 when the sharp change appears. Accordingly, the inverse of the detection and normalization result is 1 when the subtle change appears, and is 0 when the sharp change appears. The change detection unit 4c uses, as the jerk filter, the inverse of the detection and normalization result.

That is, the change detection unit 4c executes computations on the phase change in order of the third-order differential, the normalization, and the inversion. Accordingly, the change detection unit 4c may generate the jerk filter that removes only the non-subtle and sharp phase change. The change detection unit 4c multiplies an original phase change by the jerk filter.

In other words, the change detection unit 4c executes the computations of the third-order differential and the normalization on the phase change. Accordingly, when the subtle phase change appears in the difference image, the change detection unit 4c obtains a computation result having a value of 0. When the sharp phase change appears in the difference image, the change detection unit 4c obtains a computation result having a value of 1.

The change detection unit 4c generates the jerk filter by inverting the computation result. When the subtle phase change appears in the difference image, the jerk filter has a filter response of a value of 1. When the sharp phase change appears in the difference image, the jerk filter has a filter response of a value of 0. The change detection unit 4c multiplies an original phase change by the jerk filter. When the subtle phase change appears in the difference image, the original phase change is multiplied by the value of 1, and thus, the change detection unit 4c may detect only the subtle phase change. When the sharp phase change appears in the difference image, the original phase change is multiplied by the value of 0, and thus, the change detection unit 4c may suppress the sharp phase change.

The change detection unit 4c may receive the phase change information and the direction change information of the multi-resolution edge image. For each edge image having the time width "(-)t" (for example, per unit time) around time "t", the change detection unit 4c outputs the direction change information "θ$^n$(x, y, t)" to the reliability estimation unit 5c.

For each edge image having the time width "(-)t" around time "t", the change detection unit 4 detects the subtle phase change according to the direction change in the pixels in the multi-resolution edge image. The change detection unit 4c outputs subtle phase change information in the pixels in the multi-resolution edge image to the multiplication unit 6c.

The reliability estimation unit 5c receives the direction change information with the time width "(-)t". The reliability estimation unit 5c estimates the reliability "maskS$^m$" of the subtle phase change "C$^n$(x, y, t)" based on the direction change information. The reliability of the subtle phase change is the reliability of the subtle phase change that occurs in the pixel value of the image due to a physical phenomenon other than random noise. The reliability estimation unit 5c estimates the reliability so that the reliability of the subtle phase change occurring in the pixel value of the image by the random noise mixed in the image due to, for example, thermal noise of the image sensor is lower than the reliability of the subtle phase change occurring in the pixel value of the image due to the physical phenomenon other than the random noise. The reliability estimation unit 5 outputs, for example, the estimated reliability "maskS$^n$" to the multiplication unit 6c.

The multiplication unit 6c receives the subtle phase change information and the reliability. The multiplication unit c6 multiplies the subtle phase change information (value indicating the subtle phase change) by the reliability estimated by the reliability estimation unit 5c for each pixel in the edge image, and outputs a multiplication result to the change amount adjustment unit 7c.

The gentle and subtle phase change "C$^n$(X, Y, t)" is represented as in Equation (36). An operator "◯" represented in Equation (36) represents multiplication (element-wise product).

[Equation 36]

$$C^n(X,Y,t) = J(X,Y,t) \circ (H(t) \otimes \phi^n(X,Y,t)) \quad (36)$$

The change amount adjustment unit 7c acquires information on the gentle and subtle phase change "C$^n$(X, Y, t)" in the subregion (X, Y) of the difference image "L$^n$(x, y, t)" having the n-th highest resolution from the change detection unit 4c. The change amount adjustment unit 7c multiplies the gentle and subtle phase change "C$^n$(X, Y, t)" by a predetermined adjustment rate (emphasis rate) "α".

When the subtle phase change is emphasized, the predetermined adjustment rate "α" is a positive value. When the subtle phase change is attenuated, the predetermined adjustment rate "α" is a negative value. An upper limit value and a lower limit value of "α" may not be specifically determined. However, for example, when the subtle phase change is attenuated, a value of "α" in a case in which the value of the original phase change "Φ$^n$(X, Y, t)" becomes 0 reaches the lower limit of "α". When "a" is set to 0, the subtle phase change is not adjusted.

Hereinafter, for example, a symbol "^" given on a character "Φ" in Equation (37) is written immediately before the character "Φ". The change amount adjustment unit 7c derives a phase change "^Φ$^n$(X, Y, t)" in which the amount of change in the gentle and subtle phase change is adjusted as represented as in Equation (37) by adding the original phase change "Φ$^n$(X, Y, t)" to the multiplication result. By doing this, the change amount adjustment unit 7c adjusts the amount of change in the detected subtle phase change.

[Equation 37]

$$\hat{\phi}^n(X,Y,t) = \phi^n(X,Y,t) + \alpha \cdot C^n(X,Y,t) \quad (37)$$

Here, the amount of change in a phase change in a region other than the subregion (X, Y) is not adjusted (α times), and the amount of change in the phase change in the subregion (X, Y) is adjusted. Accordingly, phase changes on a boundary surface between the region other than the subregion (X, Y) and the subregion (X, Y) do not match, and thus, block noise may be generated in the difference image. Thus, Equation (37) is extended as in Equation (38) such that the adjustment rate "α" is adjustable for each subregion (X, Y).

[Equation 38]

$$\hat{\phi}^n(X,Y,t) = \phi^n(X,Y,t) + \alpha(X,Y) \cdot C^n(X,Y,t) \quad (38)$$

The method for deciding the value of the adjustment rate "α(X, Y)" for each subregion is not limited to a particular method. The method for deciding the value of the adjustment rate "α(X, Y)" for each subregion may be, for example, a method for giving a uniform weight as in Equation (37), may be a method for giving any weight in advance, or may be a method for giving a weight based on a Gaussian function or the like. The change amount adjustment unit 7c outputs information on the phase change "^Φ$^n$(X, Y, t)" in which the amount of change is adjusted to the adjusted image generation unit 9c.

The adjusted image generation unit 9c acquires the information on the phase change "^Φ$^n$(X, Y, t)" in which the amount of change is adjusted from the change amount adjustment unit 7c. The adjusted image generation unit 9c generates a difference image "^L$^n$(x, y, t)" having the n-th highest resolution in which the amount of change in the gentle and subtle motion change is adjusted based on the phase change "^Φ$^n$(X, Y, t)" in which the amount of change is adjusted as in Equation (39). That is, the adjusted image generation unit 9c generates the adjusted difference image "^L$^n$(x, y, t)" having the n-th highest resolution based on the phase change "^Φ$^n$(X, Y, t)" in which the amount of change is adjusted and the amplitude change "A$^n$(X, Y, t)" as in Equation (39).

[Equation 39]

$$\hat{L}^n(x, y, t) = \begin{cases} A^n(X, Y, t) \cdot \cos(\hat{\phi}^n(X, Y, t)) & ((x, y) \in (X, Y)) \\ L^n(x, y, t) & (\text{otherwise}) \end{cases} \quad (39)$$

The adjusted image generation unit 9c outputs the adjusted difference image "^L$^n$(x, y, t)" for each resolution to the region decision unit 10c. The adjusted image generation unit 9c outputs the adjusted difference image "^L$^n$(x, y, t)" having the n-th (0≤n≤N) resolution to the image reconstruction unit 8c.

The region decision unit 10c acquires as the edge image in which the amount of change in the motion change is adjusted, the adjusted difference image "^L$^n$(x, y, t)" having the n-th (0≤n≤N) resolution from the adjusted image generation unit 9c. The region decision unit 10c acquires, as the edge image in which the amount of change in the motion change is not adjusted, the difference image "L$^n$(x, y, t)" having the n-th (0≤n≤N) resolution from the image decomposition unit 30c. The region decision unit 10c compares the adjusted difference image "^L$^n$(x, y, t)" having the n-th highest resolution with the difference image "L$^n$(x, y, t)" having the n-th highest resolution. For example, the region decision unit 10c derives, as a comparison result "det(x, y)", a maximum value of a difference (squared value) in the spatial direction between the adjusted difference image "^L$^n$(x, y, t)" having the n-th highest resolution and the difference image "L$^n$(x, y, t)" having the n-th highest resolution at time "t" for each coordinates (x, y) as in Equation (40).

[Equation 40]

$$det(x, y) = \max_t (\hat{L}^n(x, y, t) - L^n(x, y, t))^2 \quad (31)$$

The comparison result "det(x, y)" may not be the maximum value of the difference (squared value) in the spatial direction between the difference image and the adjusted difference image at time "t". For example, the comparison result "det(x, y)" may be a total value or a variance value of differences (squared value) in the time direction between the difference images and the adjusted difference images in a time width including time "t".

For example, the region decision unit 10c decides the subregion (X, Y) of the difference image "L$^{n+1}$(x, y, t)" having the (n+1)-th highest resolution as the processing target (new processing target) subsequently to the n-th highest resolution based on the comparison result. The comparison result "det(x, y)" is compared with a threshold value, and thus, the region decision unit 10c binarizes the comparison result "det(x, y)" as in Equation (41).

[Equation 41]

$$BW(x, y) = \begin{cases} 1 \ (\det(x, y) > thr) \\ \ (\text{otherwise}) \end{cases} \quad (41)$$

Here, "thr" represents a threshold value. The method for deciding the threshold value is not limited to a particular method. For example, the method for deciding the threshold value may be, for example, a method for deciding, as the threshold value "thr", a value of "average value+2×standard deviation" when it is assumed that a distribution of the value of "det(x, y)" is a normal distribution. As in an Otsu's binarization method, when "det(x, y)" is divided into two classes, a threshold value derived such that the variance between the classes is maximized may be a threshold value "thr" to be newly used.

A subregion (patch) having a predetermined size of a length "h" and a width "w" is defined for the difference image "L$^n$(x, y, t)" and the adjusted difference image "^L$^n$(x, y, t)". The size of the subregion is defined, for example, as a size (for example, a size of four divisions in "2×2") in which the difference image and the adjusted difference image are divided into a predetermined fine grid (minimum unit). The region decision unit 10c allocates the binarization result "BW(x, y)" to the subregion having the size of the length "h" and the width "w".

For example, the region decision unit 10c performs upsampling with an aggregate region (x', y') of the subregions including one or more binarization results "BW(x, y)=1" representing that the difference exceeds the threshold value as an aggregate region (X, Y) to match the (n−1)-th highest resolution as the processing target subsequently to the n-th highest resolution. The region decision unit 10c sets the upsampled aggregate region (X, Y) as a new subregion (X, Y) as the next processing target. The region decision unit 10c outputs region information representing the new subregion (X, Y) to the image conversion unit 31c.

It is effective when the region decision unit 10c decides the processing region such that the entire region of the image having the highest resolution (the 0th highest resolution) may not be the processing target. For example, the region decision unit 10c sequentially decides the processing region starting from the lowest resolution ((N−1)-th highest resolution). The region decision unit 10c decides the new subregion as the processing target for the difference image having another resolution based on the processing result for the difference image having a predetermined resolution. The new partial region is a subregion of the difference image having another resolution, and is not the entire region of the difference image having another resolution.

That is, the region decision unit 10c starts processing of deciding the partial region (X, Y) as the processing target such that not the entire region of the difference image having the highest resolution (0th highest resolution) but the subregion is the processing target from the difference image having as low resolution as possible. For example, the region decision unit 10c sequentially decides the subregions as the processing targets in the difference images in order from the lowest resolution to the high resolution. For example, the region decision unit 10c may decide the subregions as the processing targets in the difference images in order of the odd-numbered (or even-numbered) resolutions, and then may decide the subregions as the processing targets in the difference images in order of the even-numbered (or odd-numbered) resolutions.

The image reconstruction unit 8c acquires the adjusted difference image "^L$^n$(x, y, t)" having the n-th (0≤n≤N) resolution from the adjusted image generation unit 9c. The image reconstruction unit Sc acquires the color image from the image input unit 2c. The image reconstruction unit 8c sequentially executes the processing represented in Equation (20) for the resolution number "n" based on Equations (1), (2), (3), and (39). The image reconstruction unit 8c reconstructs the luminance image "^I$^{n-1}$(x, y, t)" having the (n−1)-th highest resolution based on the adjusted difference image "^L$^{n-1}$ (x, y, t)" having the (n−1)-th highest resolution and the luminance image "^I$^n$(x, y, t)" having the n-th highest resolution as in Equation (20).

The image reconstruction unit 8c reconstructs the luminance image having the original resolution (0th highest resolution) by sequentially executing the processing represented in Equation (20) for "n". The image reconstruction unit Sc combines the reconstructed original resolution luminance image "^I$^0$(x, y, t)" and the original resolution color image. The image reconstruction unit 8c outputs the combination result to a predetermined external device as an image finally adjusted by using the video magnification.

The predetermined external device is, for example, a device that executes image processing other than video magnification, an image recognition device, or a display device.

When the predetermined external device is the image recognition device, the image recognition device may use, as a feature for image recognition, the combination result (image finally adjusted by using the video magnification).

Figure 18:
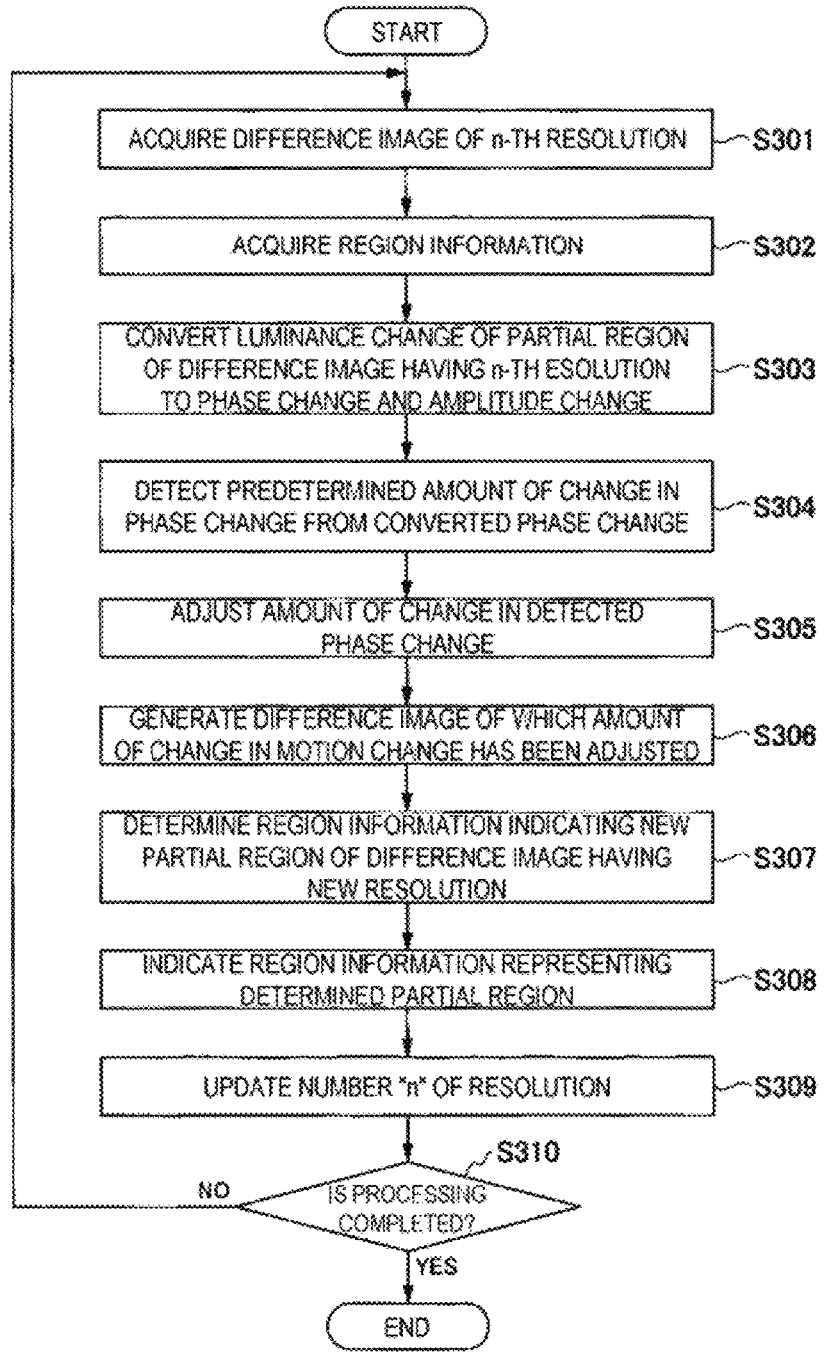
FIG. 18 is a flowchart illustrating an operation example of the image processing apparatus according to the fourth embodiment.

Next, an operation example of the image processing apparatus 1c will be described. FIG. 18 is a flowchart illustrating the operation example of the image processing apparatus 1c. The image conversion unit 31c acquires the difference image "L$^n$(x, y, t)" having the n-th highest resolution (step S301). The image conversion unit 31c acquires region information representing the instructed subregion (X, Y) (step S302). The image conversion unit 31c converts the luminance change in the subregion of the difference image having the n-th highest resolution into the phase change and the amplitude change based on the region information representing the instructed subregion (X, Y) (step S303). The change detection unit 4c detects the phase change having the predetermined amount of change from the converted phase changes (step S304).

The change amount adjustment unit 7c adjusts the amount of change in the detected phase change (step S305). The adjusted image generation unit 9c generates the difference image having the n-th highest resolution in which the amount of change in the motion change is adjusted based on the phase change of which the amount of change is adjusted (step S306). The region decision unit 10c decides a subregion (X, Y) of a difference image having a new predetermined resolution (for example, (n−1)-th highest resolution) based on the difference image having the n-th highest resolution in which the amount of change in the motion change is not adjusted and the difference image having the n-th highest resolution in which the amount of change in the motion change is adjusted (step S307).

The region decision unit 10c instructs the image conversion unit 31c to use the region information representing the decided subregion (X, Y) as the new subregion of the difference image having the new predetermined resolution (step S308). The image conversion unit 31c updates the number "n" of the predetermined resolution to the number of the new predetermined resolution (step S309).

The image conversion unit 31c determines whether the processing is completed for all the (0≤n<N)-th highest resolutions (step S310). When the processing is not completed for any resolution of the difference images having all the (0≤n<N)-th highest resolutions (step S310: NO), the image conversion unit 31c returns the processing to step S301. When the processing is completed for all the resolutions of the difference images having all the (0≤n<N)-th highest resolutions (step S310: YES), each functional unit of the image processing apparatus 1c ends the processing illustrated in the flowchart of FIG. 18.

As described above, the image processing apparatus 1c according to the fourth embodiment includes the change detection unit 4c, the change amount adjustment unit 7c, the adjusted image generation unit 9c, and the region decision unit 10c. The image processing apparatus 1c may include the image conversion unit 31c. The image conversion unit 31c acquires the edge images having mutually different resolutions (multi-resolution edge image). The image conversion unit 31c converts the luminance change of the subregion of the acquired multi-resolution edge image into the phase change and the amplitude change based on the region information (X, Y) representing the instructed subregion. The change detection unit 4c detects the phase change having the predetermined amount of change from among the phase changes in the subregions of the edge images having a predetermined resolution among mutually different resolutions. The change amount adjustment unit 7c adjusts the amount of change in the detected phase change "$C^n$(X, Y, t)". The adjusted image generation unit 9c generates the edge image "$\hat{L}^n$(x, y, t)" having the n-th highest resolution in which the amount of change in the phase change is adjusted based on the phase change "$\alpha(X, Y) \cdot C^n(X, Y, t)$" "$\hat{\Phi}^n(X, Y, t)$" in which the amount of change in the motion change is adjusted and the amplitude change "$A^n(X, Y, t)$". The region decision unit 10c decides the region information (X, Y) representing the new subregion of the edge image having the new predetermined resolution (for example, the (n−1)-th highest resolution) based on the edge image "$L^n$(x, y, t)" having the n-th highest resolution and the edge image "$\hat{L}^n$(x, y, t)" having the n-th highest resolution in which the amount of change in the motion change is adjusted. The region decision unit 10c instructs the image conversion unit 31c to use the region information representing the decided new subregion (X, Y) as the new subregion of the edge image having the new predetermined resolution.

As stated above, the region decision unit 10c instructs the image conversion unit 31c to perform processing on the new subregion of the difference image having the new predetermined resolution based on the difference image having the n-th highest resolution in which the amount of change in the motion change is not adjusted and the difference image having the n-th highest resolution in which the amount of change in the motion change is adjusted. The image conversion unit 31c executes processing on the instructed new subregion.

Accordingly, an increase in the amount of computation of the video magnification may be suppressed. The image processing apparatus 1c adaptively derives the region as the processing target of the video magnification in the frame of the moving image, and thus, the amount of computation in the phase change in the frame of the moving image may be significantly reduced. A desired image with an adjusted amount of change in the subtle motion change in the frame of the moving image may be generated at a high speed.

The region decision unit 10c may compare the maximum value "det(x, y)" of the difference (squared value) between the difference image "$L^{n-1}$(x, y, t)" and the adjusted difference image "$\hat{L}^{n-1}$(x, y, t)" for each coordinates as in Equation (40) with the predetermined value "thr" as in Equation (41). The region decision unit 10c may decide the region information (X, Y) representing the new subregion of the edge image having the new predetermined resolution based on any of coordinates at which the maximum value "BW" exceeds the predetermined value "thr" and coordinates at which the maximum value "BW" is equal to or greater than the predetermined value "thr".

As in Equation (37) or Equation (38), the change amount adjustment unit 7c multiplies the detected phase change "$C^n$(X, Y, t)" by the predetermined adjustment rate "a". Accordingly, the change amount adjustment unit 7c may adjust the amount of change in the detected phase change. The change amount adjustment unit 7c derives the phase change "$\hat{\Phi}^n$(X, Y, t)" in which the amount of change is adjusted by adding the multiplication result (adjustment result) to the original phase change "$\Phi^n$(X, Y, t)" in the subregion of the edge image having the predetermined resolution. The adjusted image generation unit 9c multiplies the value "$A^n$(X, Y, t)" representing the amplitude change in the subregion of the edge image having the predetermined resolution by a value "cos($\hat{\Phi}^n$(X, Y, t))" corresponding to the phase change in which the amount of change is adjusted. Accordingly, the adjusted image generation unit 9c may generate the difference image having the predetermined resolution in which the amount of change in the motion change of the image is adjusted. The respective embodiments may be combined with each other.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure is applicable to the image processing apparatus.

REFERENCE SIGNS LIST 1, 1a, 1b, 1c Image processing apparatus
2, 2a, 2b, 2c image input unit
3, 3a, 3b, 3c Decomposition conversion unit
4, 4a, 4b, 4c Change detection unit
5, 5a, 5b, 5c Reliability estimation unit
6, 6a, 6b, 6c Multiplication unit
7, 7a, 7b, 7c Change amount adjustment unit
8, 8a, 8b, 8c Image reconstruction unit
9c Adjusted image generation unit
10c Region decision unit
30, 30b, 30c Image decomposition unit
31, 31c Image conversion unit
100 Image adjustment unit
301 Luminance image
302 Luminance image 303 Luminance image
304 Difference image
305 Luminance image
306 Luminance image
307 Difference image
312 Stump image
313 Ax image
320 Pixel group
321 Pixel
410 Pixel
411 Pixel
412 Light bulb image

The invention claimed is:

1. An image processing apparatus comprising:
a change detector unit configured to detect a direction change, the direction change being a temporal fluctuation in a plausible direction orthogonal to an edge determined in unit of pixels in an edge image indicating a high frequency component in an image that is an image processing target, and a phase change, the phase change being a temporal fluctuation of a phase of the high frequency component according to the direction change; and
a reliability estimator configured to estimate reliability indicating that the phase change that is detected is not a change caused by noise based on a variance value of the direction change per unit time,
wherein each of the change detector and the reliability estimator is implemented by:
i) computer executable instructions executed by at least one processor,
ii) at least one circuity or
iii) a combination of computer executable instructions executed by at least one processor and at least one circuity.

2. The image processing apparatus according to claim 1, wherein the reliability estimator estimates the reliability based on the variance value of the direction change in a pixel of the pixels indicating the phase change that is detected.

3. The image processing apparatus according to claim 2, wherein the reliability becomes higher as the variance value becomes smaller.

4. The image processing apparatus according to claim 1, wherein the reliability estimator estimates the reliability based on the phase change in a region including the pixels in the edge image in time-series.

5. The image processing apparatus according to claim 1, further comprising:
a multiplicator configured to multiply the phase change that is detected by the reliability for each of the pixels in the edge image in time-series; and
a change amount adjuster configured to adjust an amount of change in the phase change multiplied by the reliability,
wherein each of the multiplicator, and the change amount adjuster is implemented by:
i) computer executable instructions executed by at least one processor,
ii) at least one circuity or
iii) a combination of computer executable instructions executed by at least one processor and at least one circuity.

6. An image processing method executed by an image processing apparatus, the image processing method comprising:
detecting a direction change, the direction change being a temporal fluctuation in a plausible direction orthogonal to an edge determined in unit of pixels in an edge image indicating a high frequency component in an image that is an image processing target, and a phase change, the phase change being a temporal fluctuation of a phase of the high frequency component according to the direction change; and
estimating reliability indicating that the phase change that is detected is not a change caused by noise based on a variance value of the direction change per unit time.

7. A non-transitory computer readable medium storing a program for causing a computer to operate as the image processing apparatus according to claim 1.

* * * * *